US012491633B2

(12) United States Patent
Hamaya et al.

(10) Patent No.: US 12,491,633 B2
(45) Date of Patent: Dec. 9, 2025

(54) TRAJECTORY GENERATION DEVICE, TRAJECTORY GENERATION METHOD, AND RECORDING MEDIUM STORING TRAJECTORY GENERATION PROGRAM

(71) Applicants: OMRON CORPORATION, Kyoto (JP); NATIONAL UNIVERSITY CORPORATION NARA INSTITUTE OF SCIENCE AND TECHNOLOGY, Nara (JP)

(72) Inventors: Masashi Hamaya, Tokyo (JP); Takamitsu Matsubara, Ikoma (JP)

(73) Assignees: OMRON CORPORATION, Kyoto (JP); NATIONAL UNIVERSITY CORPORATION NARA INSTITUTE OF SCIENCE AND TECHNOLOGY, Nara (JP)

( * ) Notice: Subject to any disclaimer, the term of this patent is extended or adjusted under 35 U.S.C. 154(b) by 332 days.

(21) Appl. No.: 18/028,911

(22) PCT Filed: Sep. 28, 2021

(86) PCT No.: PCT/JP2021/035669
§ 371 (c)(1),
(2) Date: Mar. 28, 2023

(87) PCT Pub. No.: WO2022/080132
PCT Pub. Date: Apr. 21, 2022

(65) Prior Publication Data

US 2023/0339111 A1 Oct. 26, 2023

(30) Foreign Application Priority Data

Oct. 16, 2020 (JP) ................................ 2020-175009

(51) Int. Cl.
*B25J 9/16* (2006.01)

(52) U.S. Cl.
CPC ............ *B25J 9/1664* (2013.01); *B25J 9/161* (2013.01); *B25J 9/163* (2013.01); *G05B 2219/40116* (2013.01); *G05B 2219/40499* (2013.01)

(58) Field of Classification Search
CPC .......... B25J 9/1664; B25J 9/163; B25J 9/161; G05B 2219/39298; G05B 2219/39574; G05B 2219/40116; G05B 2219/40499
See application file for complete search history.

(56) References Cited

U.S. PATENT DOCUMENTS

2018/0164781 A1 6/2018 Kubo et al.
2019/0202053 A1* 7/2019 Tan ...................... B25J 9/1664
(Continued)

FOREIGN PATENT DOCUMENTS

JP H11-085240 A 3/1999
JP 2018-097616 A 6/2018
(Continued)

OTHER PUBLICATIONS

Xie, X., et al., "Learning Virtual Grasp with Failed Demonstrations via Bayesian Inverse Reinforcement Learning", Nov. 2019, 2019 IEEE/RSJ International Conference on Intelligent Robots and Systems (IROS), pp. 1812-1817 (Year: 2019).*
(Continued)

*Primary Examiner* — Abby Lin
*Assistant Examiner* — Karston G. Evans
(74) *Attorney, Agent, or Firm* — Morgan, Lewis & Bockius LLP

(57) ABSTRACT

A trajectory generation device includes an acquisition unit, a clustering unit and a generation unit. The acquisition unit acquires successful trajectory information and failed trajectory information that are trajectory information representing sequences of states of a controlled object being taught by a
(Continued)

teacher. The successful trajectory information is trajectory information when a task performed by the controlled object is successful, and the failed trajectory information is trajectory information when the task is failed. From the states of the controlled object belonging to the successful trajectory information and the states belonging to the failed trajectory information, the clustering unit generates clusters of successful classes of the states. On the basis of the clusters of successful classes, the generation unit generates target trajectory information representing a sequence of states of the controlled object, the sequence of states being usable as control targets when the controlled object is caused to execute the task.

12 Claims, 18 Drawing Sheets

(56) References Cited

U.S. PATENT DOCUMENTS

| | | | |
|---|---|---|---|
| 2020/0139539 | A1 | 5/2020 | Hasunuma et al. |
| 2020/0230815 | A1 | 7/2020 | Nikovski et al. |

FOREIGN PATENT DOCUMENTS

| | | | |
|---|---|---|---|
| JP | 2018-206286 | A | 12/2018 |
| JP | 2019-101799 | A | 6/2019 |

OTHER PUBLICATIONS

Zhang, H., et al., "Long Time Sequential Task Learning From Unstructured Demonstrations", Jul. 23, 2019, IEEE Access, vol. 7, pp. 96240-96252 (Year: 2019).*

Hamaya, M., et al., "Learning Soft Robotic Assembly Strategies from Successful and Failed Demonstrations", Oct. 2020, 2020 IEEE/RSJ International Conference on Intelligent Robots and Systems (IROS), pp. 8309-8315 (Year: 2020).*

Choi, S., et al., "Robust Learning From Demonstrations With Mixed Qualities Using Leveraged Gaussian Processes", Jun. 2019, IEEE Transactions On Robotics, vol. 35, No. 3, pp. 564-576 (Year: 2019).*

Esteban, D., et al., "Learning Deep Robot Controllers by Exploiting Successful and Failed Executions", Nov. 2018, 2018 IEEE-RAS 18th International Conference on Humanoid Robots (Humanoids), pp. 1087-1094 (Year: 2018).*

Cederborg, T., et al., "Incremental Local Online Gaussian Mixture Regression for Imitation Learning of Multiple Tasks", Oct. 2010, The 2010 IEEE/RSJ International Conference on Intelligent Robots and Systems, pp. 267-274 (Year: 2010).*

Nishimura et al., "Peg-in-hole under state uncertainties via a passive wrist joint with push-activate-rotation function," 2017 IEEE-RAS 17th International Conference on Humanoid Robotics (Humanoids), 67-74 (2020).

Esteban et al., "Learning Deep Robot Controllers by Exploiting Successful and Failed Executions," 2018 IEEE-RAS 18th International Conference on Humanoid Robots (Humanoids), 1-9 (2018).

Shiarlis et al., "Inverse reinforcement learning from failure," International Conference on Autonomous Agents & Multiagent Systems, 1060-1068 (2016).

Enayati et al., Variable-Impedance and Force Control for Robust Learning of Contact-rich Manipulation Tasks from User Demonstration, IFAC-PapersOnline, Apr. 14, 2021, vol. 53, Issue 2, 2020, pp. 9834-9840 [online], [ScienceDirect], [retrieved on Dec. 6, 2021].

International Search Report issued in corresponding International Application No. PCT/JP2021/035669 dated Dec. 14, 2021.

Written Opinion issued in corresponding International Application No. PCT/JP2021/035669 dated Dec. 14, 2021.

Cao et al., "Robot Programming by Demonstration with Local Human Correction for Assembly", Proceeding of the IEEE International Conference on Robotics and Biomimetics, 2019, pp. 166-171.

Grollman et al., "Donut as I do: Learning from failed demonstrations", IEEE International Conference on Robotics and Automation, 2011, pp. 3804-3809.

Grollman et al., "Robot Learning from Failed Demonstrations", International Journal of Social Robotics, vol. 4, 2012, pp. 331-342.

Extended European Search Report issued in corresponding European Patent Application No. 21879873.4, dated Nov. 26, 2024.

* cited by examiner

TRAJECTORY GENERATION DEVICE, TRAJECTORY GENERATION METHOD, AND RECORDING MEDIUM STORING TRAJECTORY GENERATION PROGRAM

TECHNICAL FIELD

The present disclosure relates to a trajectory generation device, a trajectory generation method and a trajectory generation program.

BACKGROUND ART

A compliant robot with compliant portions that are physically flexible is capable of safer contacts than a rigid robot without compliant portions. Application of compliant robots to assembly operations is anticipated.

However, because of the complexity of dynamics associated with compliance, manual design of a controller is difficult.

Learning approaches (for example, reinforcement learning) are useful for design of controllers, but design of control objectives (reward functions) is difficult. This is because accurately following target states (positions) is more difficult than for a rigid robot.

For example, in a peg insertion task in which a robot inserts a peg into a hole, when an error in insertion position is used as a reward function, insertion of the peg may be performed with the peg not having reached a position over the hole or, when the peg is fitted in the hole, force may be excessive and the peg may overshoot.

Non-Patent Reference 1 discloses a method of dividing a peg insertion task into plural sub-tasks and manually designing control rules for the sub-tasks.

Non-Patent Reference 2 discloses a method of using model-based reinforcement learning (a guided policy search) for movement learning by a robot. In this method, policies are updated so as to keep the robot away from failed trajectories that the robot experiences during learning.

Non-Patent Reference 3 discloses a method of using reinforcement learning for learning rewards and policies from successful trajectories and failed trajectories conducted by a teacher. In this method, when policies and rewards are updated, constraints are applied so as to keep away from failed trajectories.

Non-Patent Reference 1: Nishimura et al., "Peg-in-hole under state uncertainties via a passive wrist joint with push-activate-rotation function," 2017 IEEE-RAS 17th International Conference on Humanoid Robotics (Humanoids), pp 67-74, 2020.

Non-Patent Reference 2: Esteban et al., "Learning Deep Robot Controllers by Exploiting Successful and Failed Executions," 2018 IEEE-RAS 18th International Conference on Humanoid Robots (Humanoids), pp 1-9, 2018.

Non-Patent Reference 3: Shiarlis et al., "Inverse reinforcement learning from failure," International Conference on Autonomous Agents & Multiagent Systems, pp 1060-1068, 2016.

SUMMARY OF INVENTION

Technical Problem

The method disclosed in Non-Patent Reference 1 has a problem in that only a designer with sufficient knowledge of a task is capable of dividing the task into plural sub-tasks.

The method disclosed in Non-Patent Reference 2 has a problem in that because a task failure is first encountered during learning, performance may vary greatly depending on the kind of failure.

The method disclosed in Non-Patent Reference 3 has a problem in that, in order to check the precision of updated policies and rewards, data on the behavior of an agent when the policies and rewards are applied must be repeatedly acquired. This method has a further problem in being administered only in a simulation that is a spatial representation of dispersed states, and is not necessarily applicable to real-world equipment.

The present disclosure is made in consideration of the matters described above: an object of the present disclosure is to provide a trajectory generation device, a trajectory generation method and a trajectory generation program that may generate target trajectory information for achieving a task with a comparatively high success rate.

Solution to Problem

A first aspect of the disclosure is a trajectory generation device including: an acquisition unit that acquires successful trajectory information and failed trajectory information that are trajectory information representing sequences of states of a controlled object being taught by a teacher, the successful trajectory information being trajectory information when a task performed by the controlled object is successful, and the failed trajectory information being trajectory information when the task is failed: a clustering unit that, from the states of the controlled object belonging to the successful trajectory information and the states of the controlled object belonging to the failed trajectory information, generates a cluster of a successful class of the states of the controlled object; and a generation unit that, on the basis of the cluster of the successful class, generates target trajectory information representing a sequence of states of the controlled object, the sequence of states being usable as control targets when the controlled object is caused to execute the task.

In the first aspect, the clustering unit may apply a clustering method that uses a Gaussian mixture model, calculate degrees of similarity among the states of the controlled object belonging to the successful trajectory information and the failed trajectory information, and generate the cluster of the successful class on the basis of the calculated degrees of similarity.

In the first aspect, the states of the controlled object may be positions of the controlled object or positions and attitudes of the controlled object, from the positions or positions and attitudes included at the states of the controlled object belonging to the successful trajectory information and the failed trajectory information, the clustering unit may calculate a speed of the controlled object at each state, and the clustering unit may calculate the degrees of similarity from the positions or positions and attitudes at the states and the speeds at the states.

In the first aspect, the clustering unit may adjust the degrees of similarity among the states of the controlled object with an adjustment parameter that adjusts the degrees of similarity.

In the first aspect, the clustering unit may specify the adjustment parameter so as to increase a degree of similarity between states of the controlled object that both belong to the successful trajectory information and reduce a degree of similarity between a state of the controlled object that belongs to the successful trajectory information and a state of the controlled object that belongs to the failed trajectory information.

In the first aspect, the generation unit may apply a Gaussian mixture regression method to the cluster of the successful class for generating the target trajectory information.

In the first aspect, the acquisition unit may cause a display that provides guidance on the trajectory that is to be taught.

A second aspect of the disclosure is a trajectory generation method including a computer: acquiring successful trajectory information and failed trajectory information that are trajectory information representing sequences of states of a controlled object being taught by a teacher, the successful trajectory information being trajectory information when a task performed by the controlled object is successful, and the failed trajectory information being trajectory information when the task is failed: from the states of the controlled object belonging to the successful trajectory information and the states of the controlled object belonging to the failed trajectory information, generating a cluster of a successful class of the states of the controlled object; and, on the basis of the cluster of the successful class, generating target trajectory information representing a sequence of states of the controlled object, the sequence of states being usable as control targets when the controlled object is caused to execute the task.

A third aspect of the disclosure is a trajectory generation program for causing a computer to execute processing including: acquiring successful trajectory information relating to a successful trajectory when an operation by a controlled object is successful and failed trajectory information relating to a failed trajectory when an operation by the controlled object fails: on the basis of the successful trajectory information and the failed trajectory information, clustering positions of the controlled object on the successful trajectory and positions of the controlled object on the failed trajectory into a successful class and a failed class by a clustering method specified in advance; and, on the basis of the positions of the controlled object clustered in the successful class, generating target trajectory information relating to a target trajectory of the controlled object.

Advantageous Effects of Invention

According to the present disclosure, target trajectory information for achieving a task with a comparatively high success rate may be generated.

DETAILED DESCRIPTION

Figure 1:
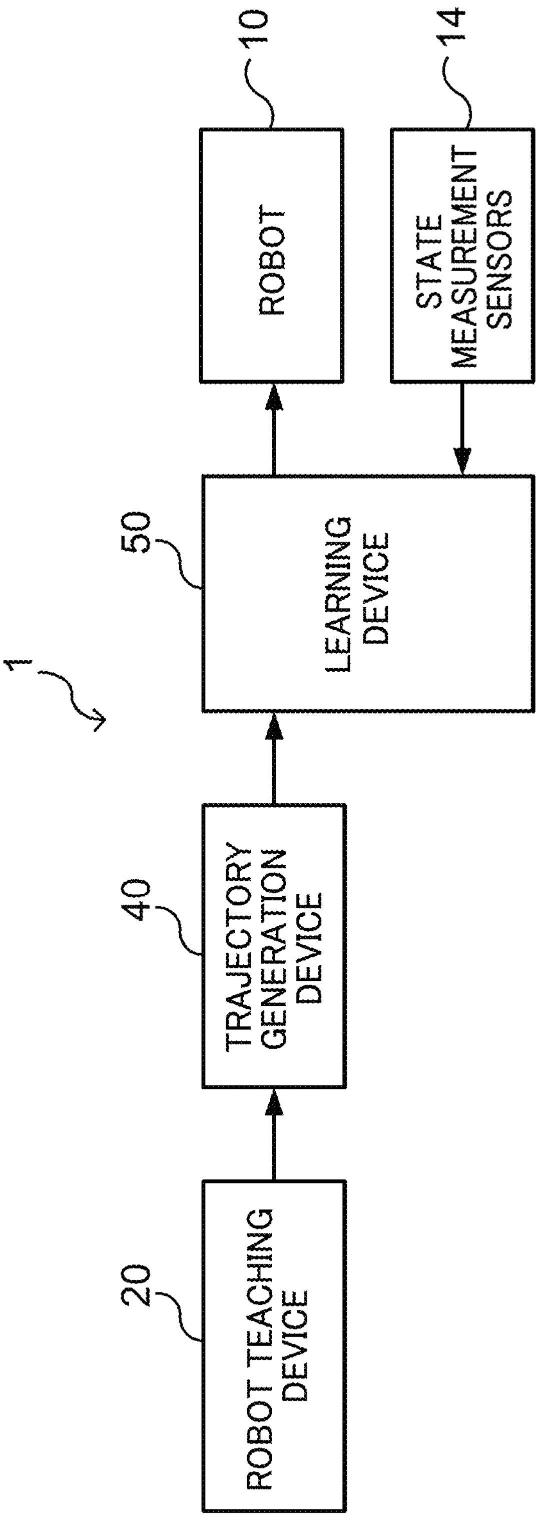
FIG. 1 is a structural diagram of a robot system.

Below, an example of an embodiment of the present disclosure is described with reference to the drawings. In the drawings, the same reference symbols are assigned to structural elements and portions that are the same or equivalent. Proportional dimensions in the drawings may be exaggerated to facilitate description and may be different from actual proportions.

FIG. 1 shows structures of a robot system 1 for learning by a model for control of a robot 10. The robot system 1 includes the robot 10, a robot teaching device 20, state measurement sensors 14, a trajectory generation device 40 and a learning device 50.

—Robot—

Figure 2A:
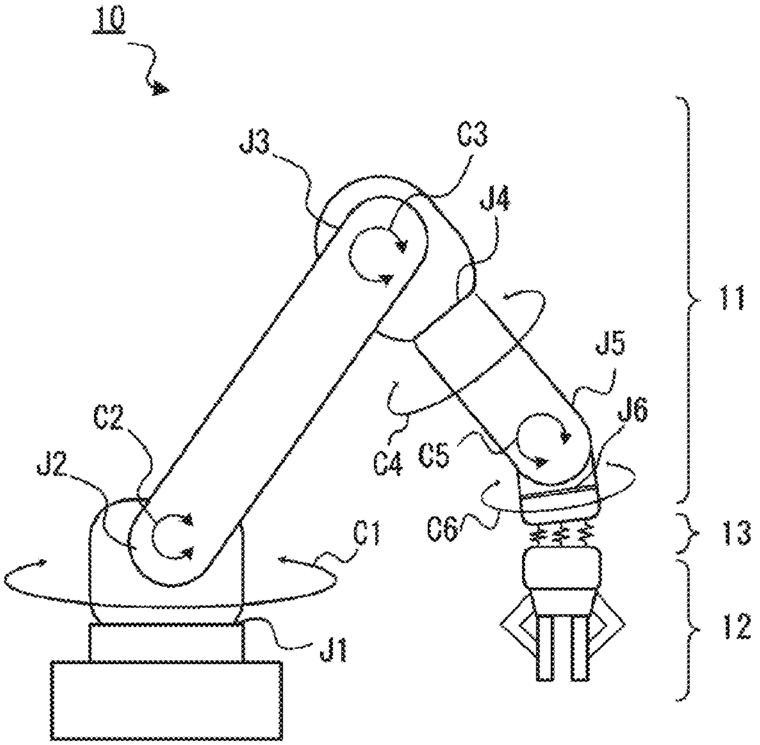
FIG. 2A is a diagram showing schematic structures of a robot 10.
Figure 2B:
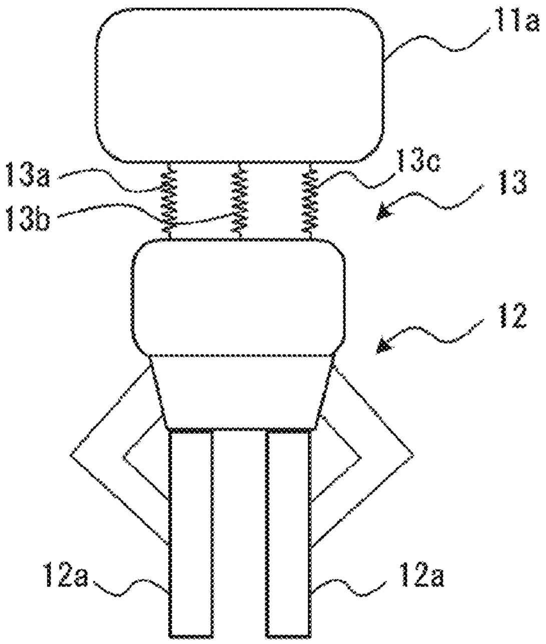
FIG. 2B is a magnified diagram of a distal end side of an arm of the robot.

FIG. 2A and FIG. 2B are diagrams showing schematic structures of the robot 10, which is an example of a controlled object. The robot 10 according to the present exemplary embodiment is a six-axis vertical articulated robot in which a gripper (a hand) 12 is provided at a distal end 11*a* of an arm 11, via a compliant portion 13. The robot 10 retains a component (as an example, a peg) with the gripper 12 and performs an insertion task to insert the component in a hole.

As shown in FIG. 2A, the robot 10 includes the arm 11 with six degrees of freedom, which is equipped with joints J1 to J6. At the joints J1 to J6, links are joined to be rotatable in the directions of arrows C1 to C6 by motors that are not shown in the drawings. A vertical articulated robot is illustrated as an example in this exemplary embodiment, but a horizontal articulated robot (a SCARA robot) may be employed. In addition, although a six-axis robot is illustrated as an example, an articulated robot with alternative degrees of freedom such as five axes or seven axes may be employed, or a parallel link robot may be employed.

The gripper 12 includes a pair of retention portions 12*a*. The retention portions 12*a* are controlled to nip a component. The gripper 12 is joined to the distal end 11*a* of the arm 11 via the compliant portion 13, and moves in accordance with movements of the arm 11. In the present exemplary embodiment, the compliant portion 13 is structured by three springs 13*a* to 13*c*, which are arranged in a positional relationship such that base portions of the springs are at the vertices of an equilateral triangle. The number of springs may be any number. The compliant portion 13 may have an alternative structure, provided the compliant portion 13 is a structure that generates restoring force in response to changes in position and provides flexibility. For example, the compliant portion 13 may have resilient bodies such as springs, rubber blocks or the like, or dampers, pneumatic or hydraulic cylinders and so forth. The compliant portion 13 is preferably structured by passive components. The distal end 11*a* of the arm 11 and the gripper 12 are structured to be relatively movable in accordance with the compliant portion 13 in a longitudinal direction and perpendicular directions by 5 mm or more, preferably by 1 cm or more, and more preferably by 2 cm or more.

A structure may be provided such that the gripper 12 can be switched between a flexible state and a fixed state relative to the arm 11.

The structure illustrated in this exemplary embodiment is provided with the compliant portion 13 between the distal end 11*a* of the arm 11 and the gripper 12. However, the compliant portion 13 may be provided partway along the gripper 12 (for example, a location of a finger joint or partway along a columnar portion of a finger) or partway along the arm (for example, at the location of any of the joints J1 to J6 or partway along a columnar portion of the arm). Furthermore, the compliant portion 13 may be provided at a plural number of these locations.

The robot system 1 uses machine learning (for example, model-based reinforcement learning) to acquire a model for controlling the robot 10 that is equipped with the compliant portion 13 as described above. Because the robot 10 includes the compliant portion 13, a gripped component is safe even if it comes into contact with the surroundings, and an insertion task or the like may be executed even if a control cycle is slow. However, because of the compliant portion 13, positions of the gripper 12 and the component are uncertain. As a result, it is difficult to provide an analytical control model. Accordingly, in the present exemplary embodiment machine learning is used to acquire a control model.

In the present exemplary embodiment, as an example, the robot teaching device 20 is used to generate trajectory information for teaching the robot 10 a single operation (task), which is a peg insertion task. The peg insertion task is described as being divided into plural operation sub-tasks. In the present exemplary embodiment, the robot teaching device 20 is used to generate trajectory information corresponding to a single operation sub-task or plural successive operation sub-tasks.

Figure 3:
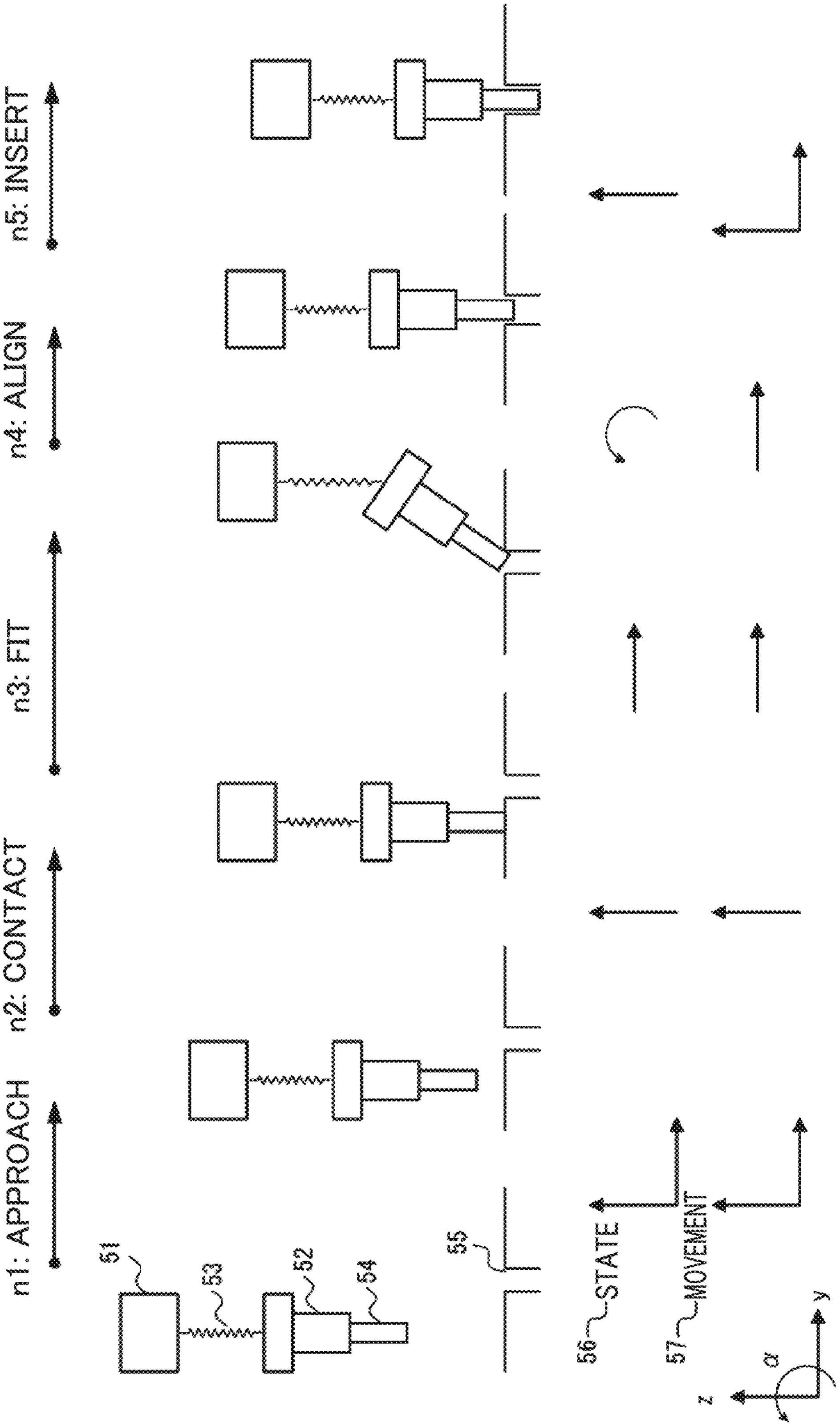
FIG. 3 is a diagram for describing operation sub-tasks that constitute a peg insertion task.

Operation sub-tasks that constitute the peg insertion task according to the present exemplary embodiment are described with reference to FIG. 3. In FIG. 3, the reference symbol 51 indicates an arm distal end, 52 indicates a gripper, 53 indicates a compliant portion, 54 indicates a gripped object (a peg), and 55 indicates a hole. The reference symbols 56 and 57 in FIG. 3 indicate states and movements associated with the operation sub-tasks.

The overall objective of the peg insertion task is to insert the peg 54 into the hole 55. The peg insertion task is easier to understand if divided into the following five operation sub-tasks.

n1: Approach
n2: Contact
n3: Fit
n4: Align
n5: Insert

The sub-task "n1: Approach" is an operation of bringing the gripper 52 from an arbitrary initial position to near the hole 55. The sub-task "n2: Contact" is an operation of putting the peg 54 into contact with a surface near the hole 55. If the compliant portion 53 is switchable between a fixed mode and a flexible mode, the compliant portion 53 is switched to the flexible mode prior to the contact. The sub-task "n3: Fit" is an operation of moving the peg 54 while maintaining the state of contact with the surface, and fitting a distal end of the peg 54 into a distal end of the hole 55. The sub-task "n4: Align" is an operation of making an attitude of the peg 54 parallel with an axis of the hole 55 (vertical in this example) while maintaining the state in which the distal end of the peg 54 is in contact with the hole 55. The sub-task "n5: Insert" is an operation of inserting the peg 54 as far as a bottom of the hole 55.

A teacher uses the robot teaching device 20, which is described below, in accordance with one of the operation sub-tasks described above or plural successive operation sub-tasks and, by executing operations with which insertion of the peg 54 would succeed and operations with which the insertion would fail, generates trajectory information of successful trajectories and failed trajectories.

—Robot Teaching Device—

Figure 4:
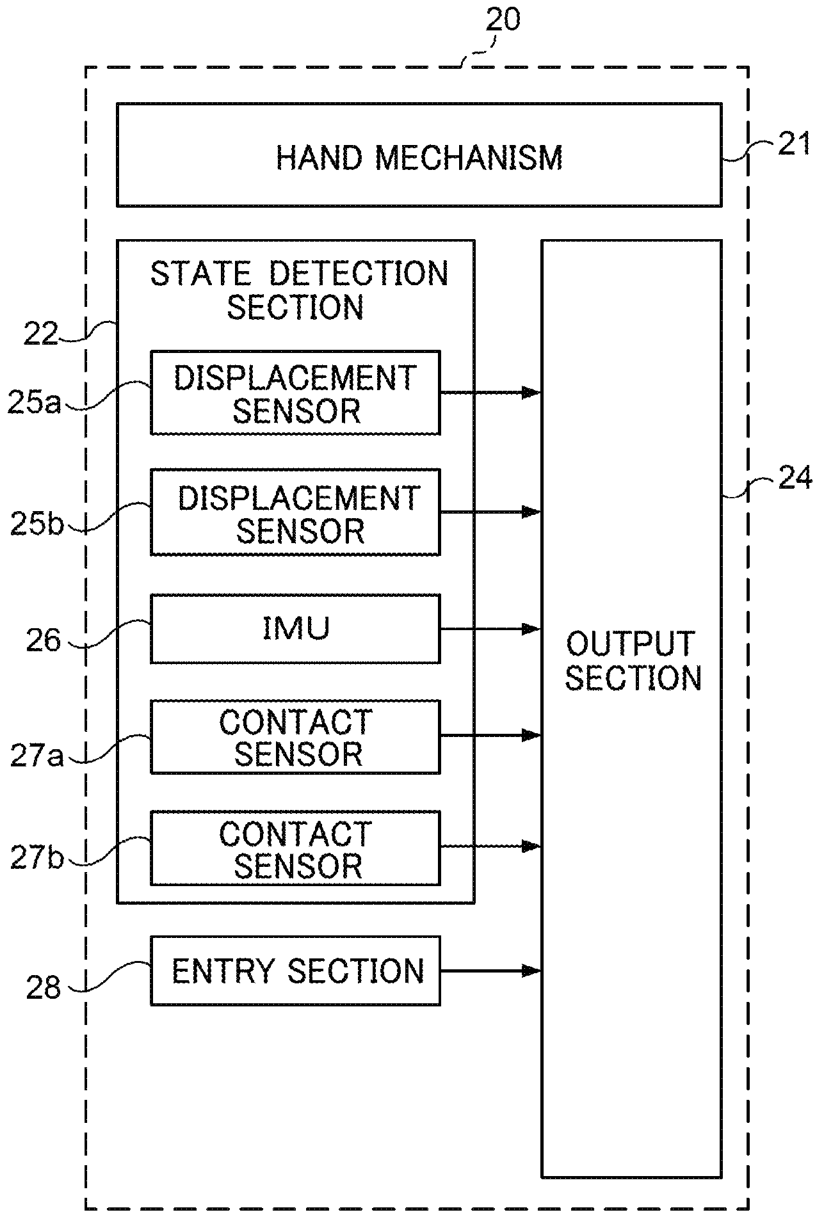
FIG. 4 is a structural diagram of a robot teaching device.

As shown in FIG. 4, the robot teaching device 20 includes a hand mechanism 21, a state detection section 22, an output section 24 and an entry section 28. To describe this in more detail, the state detection section 22 is equipped with displacement sensors 25*a* and 25*b*, an IMU 26 and contact sensors 27*a* and 27*b*.

Figure 5:
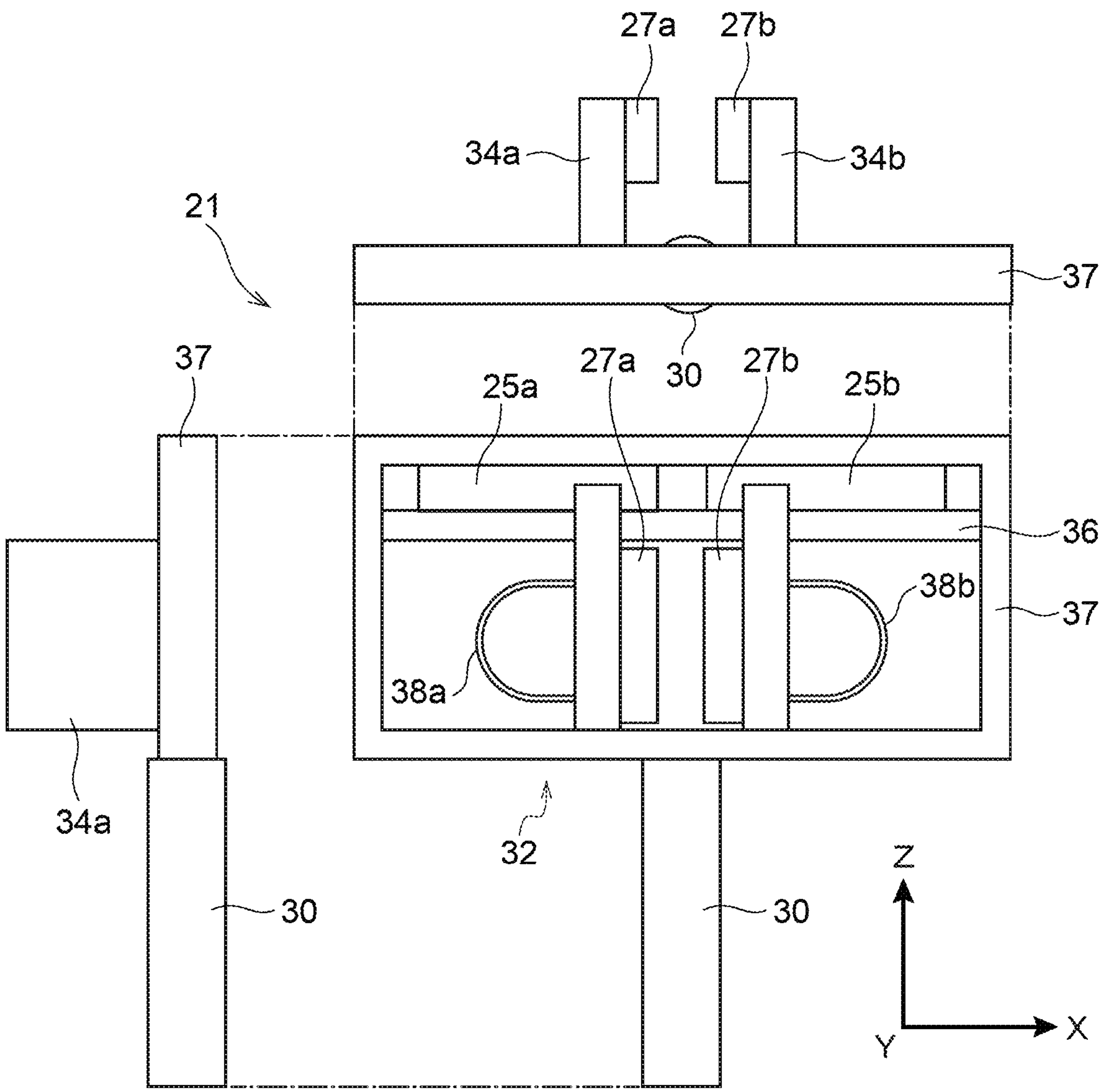
FIG. 5 is a three-view diagram of a hand mechanism.
Figure 6:
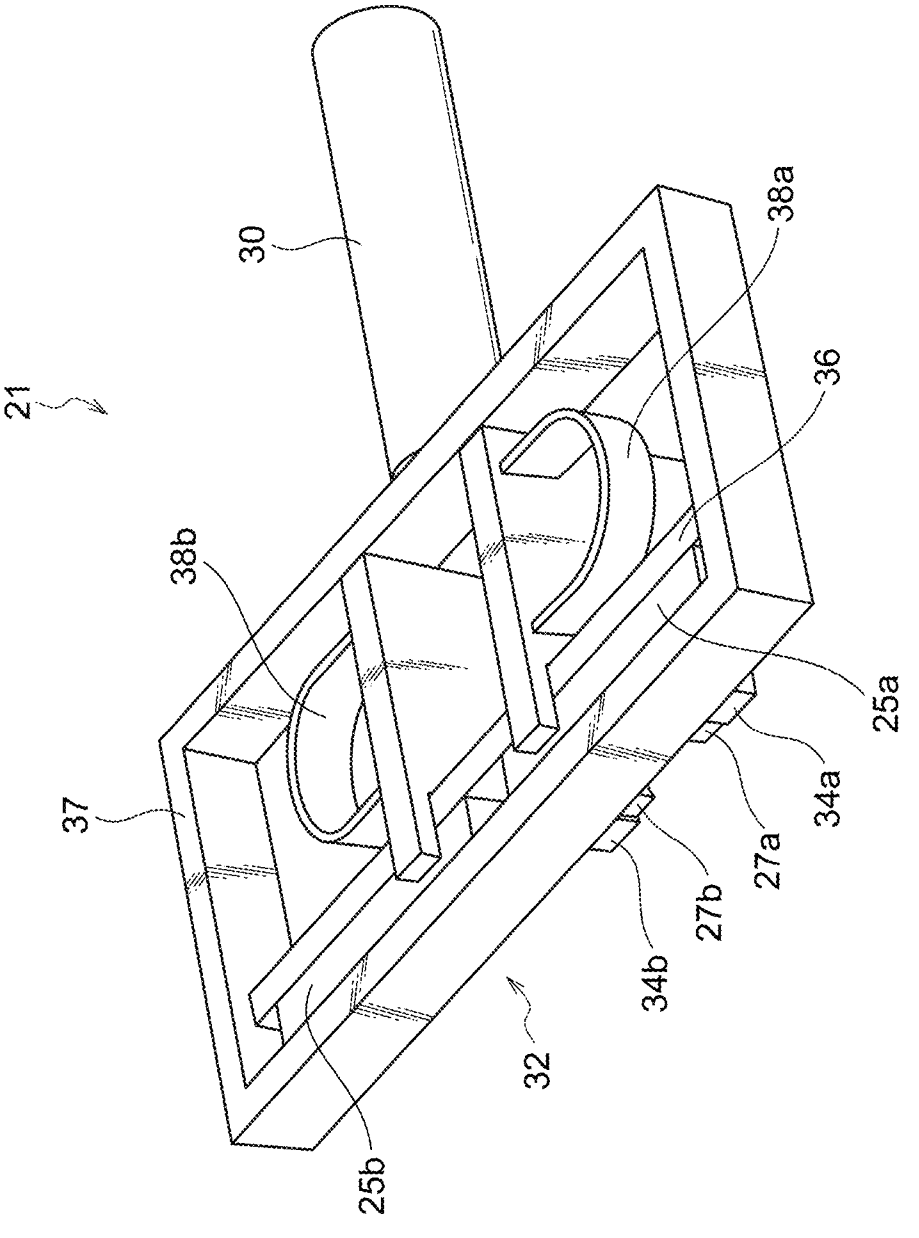
FIG. 6 is a perspective view of the hand mechanism.

FIG. 5 shows a three-view diagram of the hand mechanism 21, and FIG. 6 shows a perspective view of the hand mechanism 21.

As shown in FIG. 5 and FIG. 6, the hand mechanism 21 is equipped with a handle 30 and a manipulator 32 attached to one end of the handle 30. As an example in the present exemplary embodiment, the handle 30 has a circular rod shape.

The manipulator 32 is equipped with two fingers 34*a* and 34*b* that grip a manipulated object, and an opening/closing mechanism 36 that enables opening and closing of the two fingers 34*a* and 34*b*.

In the present exemplary embodiment, the fingers 34*a* and 34*b* correspond with the retention portions 12*a* in FIG. 2, and the manipulated object that is gripped by the fingers 34*a* and 34*b* corresponds with the peg 54 in FIG. 3.

A belt 38*a* is attached to the finger 34*a*, and a belt 38*b* that is similar to the belt 38*a* is attached to the finger 34*b*.

Figure 7:
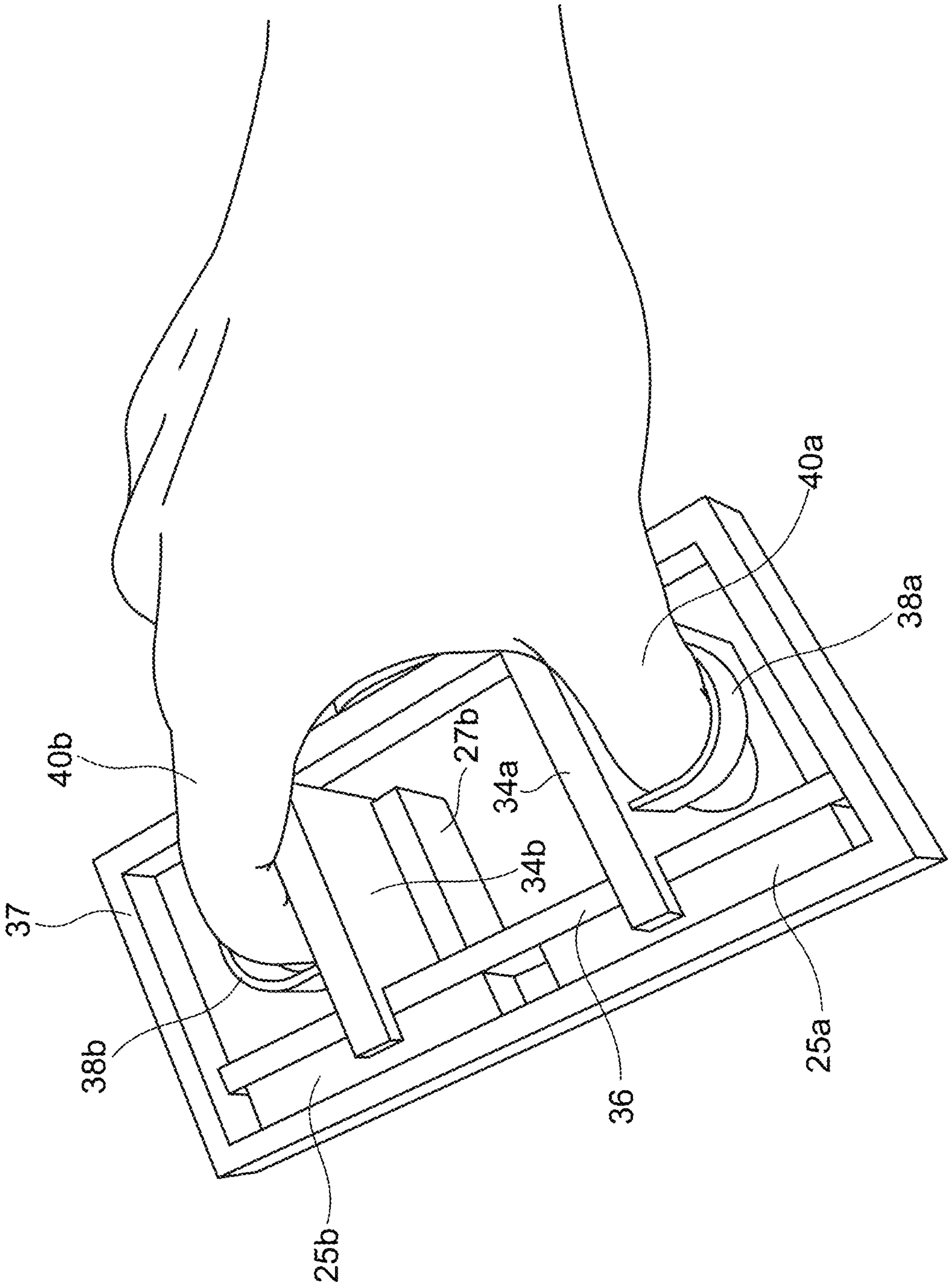
FIG. 7 is a diagram showing a state in which the hand mechanism is held by a hand.

As shown in FIG. 7, a user acting as a teacher may hold the hand mechanism 21 by inserting a thumb 40*a* into the belt 38*a*, inserting an index finger 40*b* into the belt 38*b*, and gripping the handle 30 with their other fingers. That is, the hand mechanism 21 has a shape that can be held by a user.

As an example in the present exemplary embodiment, the opening/closing mechanism 36 is a linear guide that guides the fingers 34*a* and 34*b* to enable opening and closing in an X direction of a hand mechanism coordinate system. The opening/closing mechanism 36 is attached to a rectangular frame 37.

Figure 8:
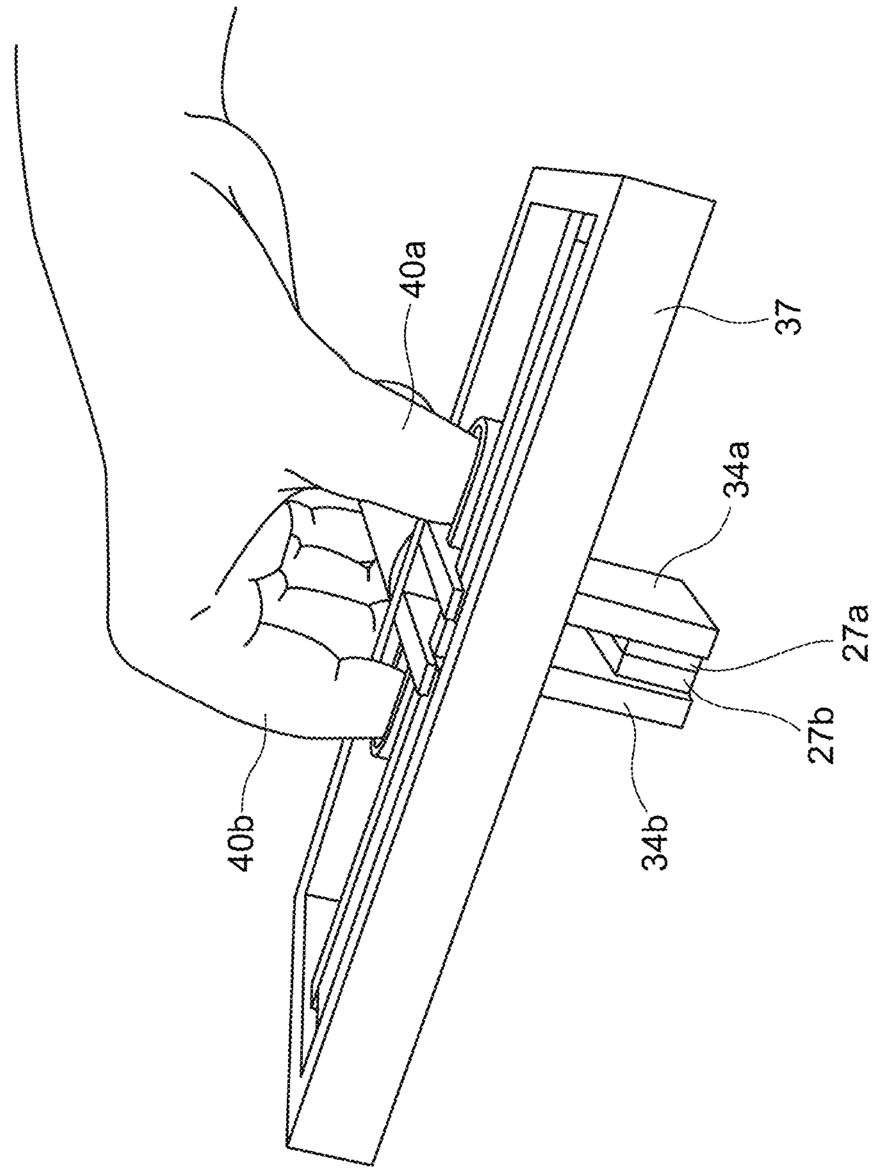
FIG. 8 is a diagram showing a state in which fingers of the hand mechanism are closed up.

As shown in FIG. 8, in the state in which the user has inserted their thumb 40*a* into the belt 38*a* and inserted their index finger 40*b* into the belt 38*b*, by making a movement to narrow a gap between the thumb 40*a* and the index finger 40*b*, the user moves the fingers 34*a* and 34*b* along the opening/closing mechanism 36 in the X direction and may close up the fingers 34*a* and 34*b*.

Figure 9:
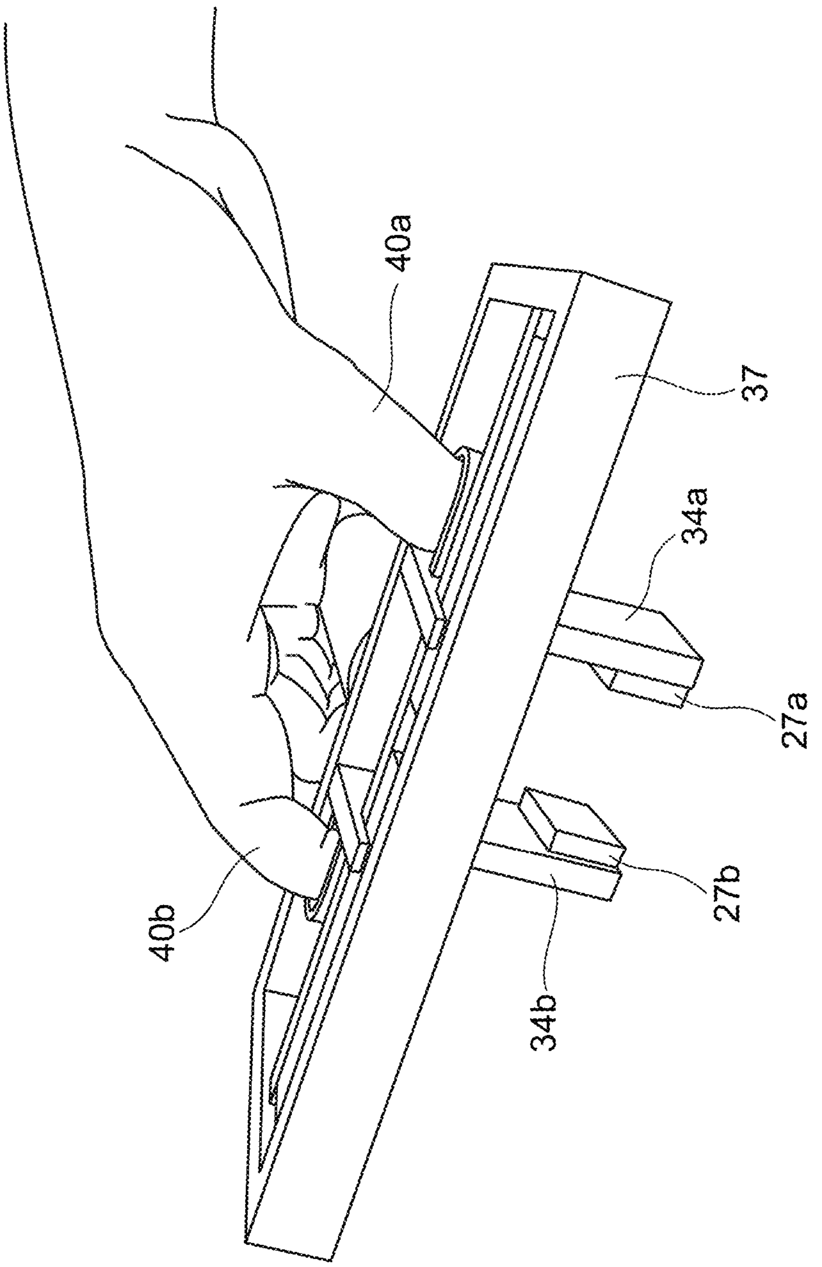
FIG. 9 is a diagram showing a state in which the fingers of the hand mechanism are opened up.

As shown in FIG. 9, by making a movement to widen the gap between the thumb 40*a* and the index finger 40*b*, the user moves the fingers 34*a* and 34*b* along the opening/closing mechanism 36 in the X direction and may open up the fingers 34*a* and 34*b*.

The state detection section 22 detects a position of the hand mechanism 21 or a position and attitude of the hand mechanism 21 to serve as a state of the robot 10. The state detection section 22 may also detect positions of the plural fingers 34*a* and 34*b* of the hand mechanism 21.

More specifically, the state detection section 22 is equipped with the IMU (Inertial Measurement Unit) 26, which detects positions and attitudes of the hand mechanism 21 itself. The IMU 26 is not illustrated in FIG. 5 and the like but is, for example, attached to the rectangular frame 37. The IMU 26 is a device that detects translational movements and rotational movements in three orthogonal axis directions. The IMU 26 includes, for example, an acceleration sensor and a gyro sensor, detecting translational movements with the acceleration sensor and detecting rotational movements with the gyro sensor.

The IMU 26 detects positions of the hand mechanism 21, more specifically displacement amounts of the hand mechanism 21 along each axis direction. The IMU 26 also detects attitudes of the hand mechanism 21, more specifically angles of inclination of the hand mechanism 21 relative to each axis.

When teaching an operation in which a constant attitude is maintained, such as when teaching an operation that maintains an attitude in which the gripper 12 of the robot 10 is angled vertically downward, it is sufficient that the position of the hand mechanism 21 may be detected. Accordingly, the sensor that detects attitudes of the hand mechanism 21 may be omitted.

The state detection section 22 is also equipped with the displacement sensors 25*a* and 25*b* that detect positions of the fingers 34*a* and 34*b*.

The displacement sensors 25*a* and 25*b* are provided between the opening/closing mechanism 36 and the rectangular frame 37. The displacement sensor 25*a* detects positions of the finger 34*a* along the X axis direction, as a specific example detecting displacement amounts along the X axis direction from a reference position specified in advance (for example, a position at which the fingers 34*a* and 34*b* are closed up). Similarly, the displacement sensor 25*b* detects positions of the finger 34*b* along the X axis direction. The displacement sensors 25*a* and 25*b* may utilize, for example, potentiometers, linear encoders or the like, but are not limited thus.

If the state detection section 22 is in a structure in which the fingers 34*a* and 34*b* move symmetrically, then rather than detecting the positions of the fingers independently, a distance between the fingers 34*a* and 34*b* or the position of just one of the fingers may be detected. The positions of the fingers 34*a* and 34*b* may be calculated from the detection results: this kind of detection is encompassed by detection of the positions of the plural fingers.

The state detection section 22 is equipped with the contact sensor 27*a*, which is attached to a surface of the finger 34*a* at the side thereof that grips the manipulated object, which is the peg 54. Similarly, the state detection section 22 is equipped with the contact sensor 27*b*, which is attached to a surface of the finger 34*b* at the side thereof that grips the peg 54. The state detection section 22 may be equipped with just one or other of the contact sensors 27*a* and 27*b*.

The contact sensors 27*a* and 27*b* detect pressure forces that the fingers 34*a* and 34*b* gripping the peg 54 receive from the peg 54 that is in contact with the contact sensors 27*a* and 27*b*.

The output section 24 outputs a sequence of states detected by the state detection section 22 to serve as trajectory information of the robot 10. The trajectory information that is outputted includes, for example, positions and attitudes of the hand mechanism 21 that are detected by the IMU 26 in a chronological sequence while the user is using the robot teaching device 20 to perform the operation that is to be taught to the robot 10. As a specific example, the output section 24 is configured with wireless communication functions and transmits the trajectory information to the trajectory generation device 40. Further, the output section 24 may output and memorize the trajectory information at a memory that is not shown in the drawings.

The trajectory information that the output section 24 outputs may include positions of the fingers 34*a* and 34*b* detected by the displacement sensors 25*a* and 25*b*, and may further include pressure forces detected by the contact sensors 27*a* and 27*b*.

The entry section 28 is for a user to enter whether a task succeeds or fails. For example, a success button for entering that the task of inserting the peg 54 into the hole 55 is successful and a failure button for entering that the task of inserting the peg 54 into the hole 55 is failed are provided at the rectangular frame 37 of the hand mechanism 21 to serve as the entry section 28. When a task of using the robot teaching device 20 to insert the peg 54 into the hole 55 is successful, the user may press the success button when the operation has been performed. Hence, the output section 24 outputs generated trajectory information to the trajectory generation device 40 as successful trajectory information. For example, the output section 24 outputs information indicating success with the trajectory information. When a task of inserting the peg 54 into the hole 55 fails, the user may press the failure button when the operation has been performed. In this case, the output section 24 outputs generated trajectory information to the trajectory generation device 40 as failed trajectory information. For example, the output section 24 outputs information indicating failure with the trajectory information.

—State Measurement Sensors—

The state measurement sensors 14 measure states of the robot 10 and output measured data to serve as state measurement data. For example, encoders at joints of the robot 10, a visual sensor (a camera), motion capture and the like can be used as the state measurement sensors 14. As a state of the robot 10, a position and attitude of the distal end 11*a* of the arm 11 may be determined from angles of the joints, and an attitude of a component (an operated object) may be inferred from the visual sensor. If markers for motion capture are attached to the gripper 12, the position and attitude of the gripper 12 may be determined as the state of the robot 10, and the attitude of the component (operated object) may be inferred from the position and attitude of the gripper 12.

Depending on the visual sensor, a position and attitude of the gripper 12 itself or the component gripped by the gripper 12 may be detected as a state of the robot 10. When the compliant portion is between the gripper 12 and the arm 11, depending on a displacement sensor that detects displacements of the gripper 12 relative to the arm 11, a position and attitude of the gripper 12 relative to the arm 11 may be determined as a state of the robot 10. Thus, states of at least one of the compliant portion 13, a portion of the robot 10 at the side thereof relative to the compliant portion 13 that grips the object, and the gripped component may be detected by various sensors, and detection results of the various sensors may be acquired as to serve as state measurement data.

As examples of state measurement data, an angle and angular speed of each joint of the robot 10 acquired from encoders at the joints, an image obtained by a visual sensor mounted at the arm of the robot 10, a relative displacement between portions sandwiching the compliant portion 13 that is measured by a displacement sensor provided at the compliant portion 13, and a position and attitude of the gripper 12 measured by motion capture can be mentioned.

Positions, attitudes (angles), speeds, and angular speeds of attitude changes of the distal end 11*a* of the arm 11 can be calculated from data from joint encoders. If positions and attitudes (angles) at respective times can be acquired, time changes (speeds and angular speeds) may be acquired: the fact that time changes can be acquired may be not recited in the descriptions below. Positions and attitudes of the gripper 12 and a gripped object relative to the arm 11 can be calculated from data from a visual sensor.

If markers for motion capture are attached to the gripper 12, the position and attitude of the gripper 12 may be acquired by motion capture alone. The position and attitude of a gripped object relative to the arm may be found by using a visual sensor. Further, the position and attitude of a gripped object may be acquired if markers are attached to the gripped object.

—Trajectory Generation Device—

Figure 10:
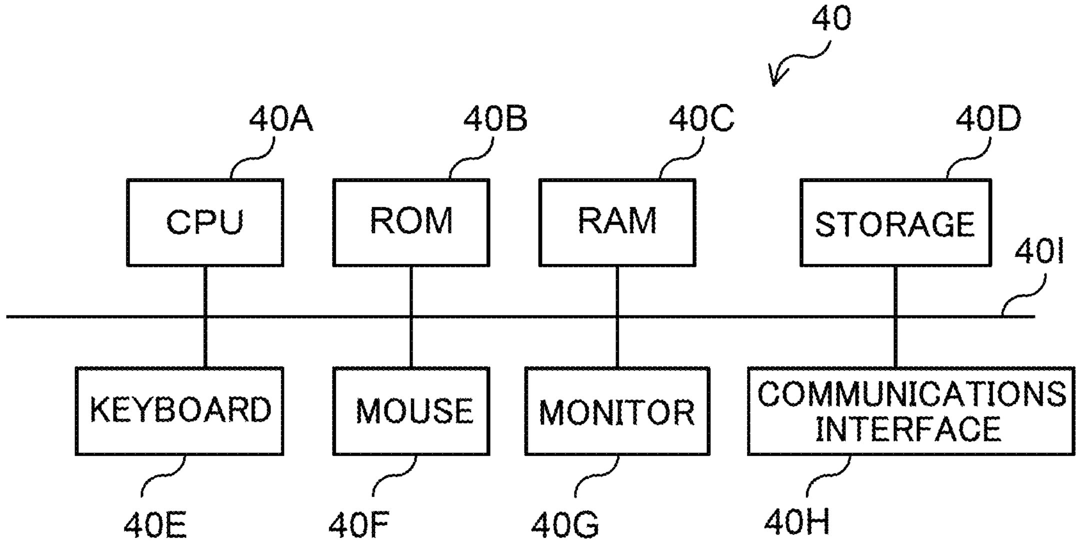
FIG. 10 is a block diagram showing hardware structures of a trajectory generation device.

FIG. 10 is a block diagram showing hardware structures of the trajectory generation device according to the present exemplary embodiment. As shown in FIG. 10, the trajectory generation device 40 has a structure similar to a general-purpose computer (an information processing device), including a central processing unit (CPU) 40A, read-only memory (ROM) 40B, random access memory (RAM) 40C, storage 40D, a keyboard 40E, a mouse 40F, a monitor 40G, and a communications interface 40H. These structures are connected to be capable of communicating with one another via a bus 40I.

In the present exemplary embodiment, a trajectory generation program for executing trajectory generation processing is stored in the ROM 40B or the storage 40D. The CPU 40A is a central arithmetic processing unit, which executes various programs and controls various structures. That is, the CPU 40A reads a program from the ROM 40B or storage 40D and executes the program using the RAM 40C as a work area. The CPU 40A performs control of the structures described above and various kinds of arithmetic processing in accordance with the program memorized in the ROM 40B or storage 40D. The ROM 40B memorizes various programs and various kinds of data. The RAM 40C serves as a work area and temporarily memorizes programs and data. The storage 40D is structured with a hard disk drive (HDD), solid-state drive (SSD) or flash memory. The storage 40D stores various programs, including an operating system, and various kinds of data. The keyboard 40E and mouse 40F are examples of entry devices and can be employed for various kinds of entry. The monitor 40G is, for example, a liquid crystal display, displaying the user interface. The monitor 40G may employ a touch panel system and also function as an entry unit. The communications interface 40H is an interface for communications with other equipment. The communications interface 40H employs a standard such as, for example, Ethernet (registered trademark), FDDI, Wi-Fi (registered trademark) or the like.

Now, functional structures of the trajectory generation device 40 are described.

Figure 11:
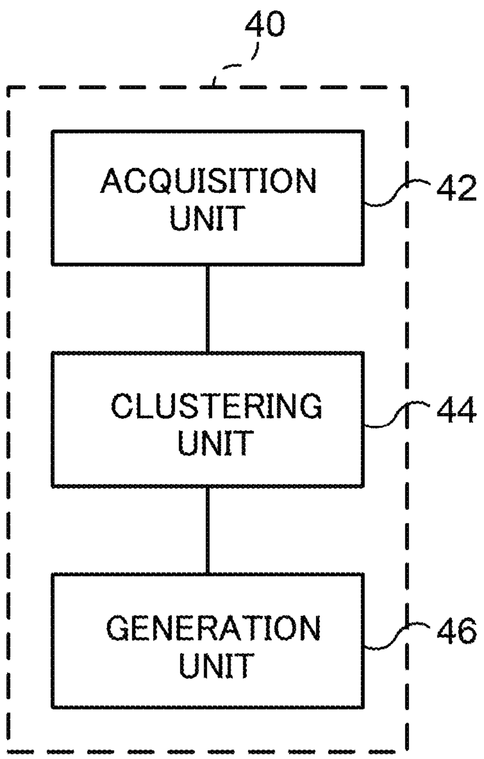
FIG. 11 is a functional block diagram of the trajectory generation device.

As shown in FIG. 11, as functional structures, the trajectory generation device 40 includes an acquisition unit 42, a clustering unit 44 and a generation unit 46. The functional structures are realized by the CPU 40A reading the trajectory generation program memorized at the ROM 40B or storage 40D and loading the trajectory generation program into the RAM 40C. Some or all of the functions may equally be realized by dedicated hardware equipment.

The acquisition unit 42 acquires trajectory information representing a sequence of states of a controlled object being taught by a teacher, which is successful trajectory information that is trajectory information when a task performed by the controlled object is successful and failed trajectory information that is trajectory information when the task is failed. In the present exemplary embodiment, the controlled object is the robot 10, specifically the gripper 12, and the states of the controlled object include at least positions of the gripper 12. Positions of the gripper 12 are generally represented by values in three degrees of freedom. However, when one degree of freedom of movement is constrained, such as when an object gripped by the gripper 12 is in contact with a surface, the constrained degree of freedom may be treated as a fixed value and values in the other two degrees of freedom may serve as effective trajectory information. Positions of the gripper 12 may be represented by positions of a tool center point (TCP). If the attitude of the gripper 12 changes, it is preferable if states of the controlled object include attitudes of the gripper 12 (for example, represented by values in three degrees of freedom). Positions of the fingers 34*a* and 34*b* of the gripper 12 may also be included. Thus, the trajectory information is not limited to position information of the controlled object in a three-dimensional space or to position information and attitude information, but may include information in more numerous dimensions relating to states of the controlled object.

The teacher uses the robot teaching device 20 to generate trajectory information from start to finish of a task to be performed by the robot 10 or for a portion of the task. As an example in the present exemplary embodiment, the task to be performed by the robot 10 is an insertion task of gripping a peg with the gripper 12 and inserting the peg into a hole, but the task is not limited thus.

By using the robot teaching device 20 to execute successful operations and failed operations of the task to be performed by the robot 10, the teacher generates trajectory information of successful trajectories and failed trajectories.

More specifically, the teacher uses the robot teaching device 20 to generate successful trajectory information in which the task of inserting the peg 54 into the hole 55 is a successful operation at least once. The teacher also uses the robot teaching device 20 to generate failed trajectory information in which the task of inserting the peg 54 into the hole 55 is a failed operation at least once. It is preferable if plural sets of failed trajectory information are generated in which the task is a failed operation plural times. In this case, it is preferable if plural sets of failed trajectory information in which the robot teaching device 20 is moved on a variety of trajectories are generated, such as, for example, a trajectory that moves the peg 54 in a different direction from a direction toward the hole 55, a trajectory in which the peg 54 passes over the hole 55, and the like. In particular, it is preferable if failed trajectory information of trajectories in which insertion in the vicinity of the hole 55 fails are generated.

The acquisition unit 42 may implement a display that provides guidance on a trajectory that is to be taught. For example, displays of how a teacher should teach successful trajectories and failed trajectories may be displayed at the monitor 40G, or a display device that is an external unit of the trajectory generation device 40, so as to support teaching by the teacher.

Figure 12A:
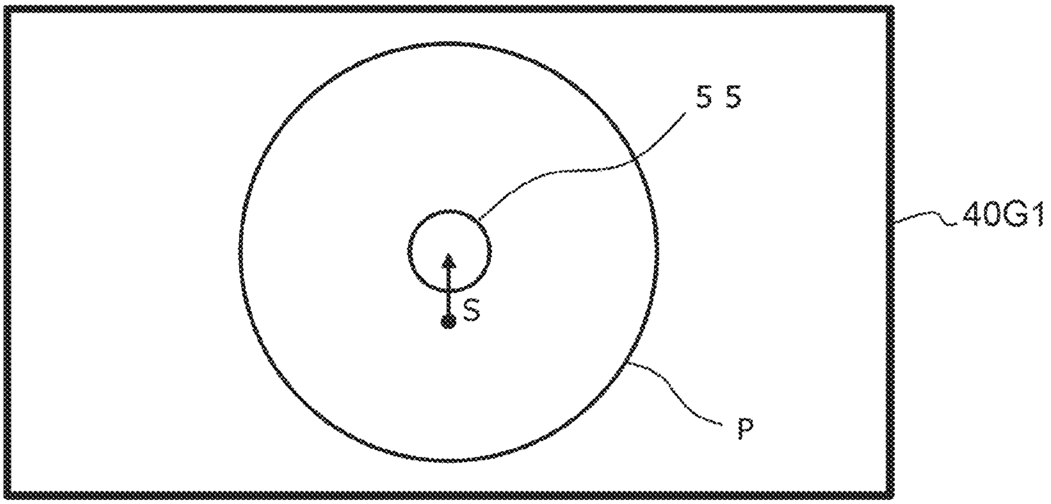
FIG. 12A is a diagram showing a teaching trajectory guidance display.
Figure 12B:
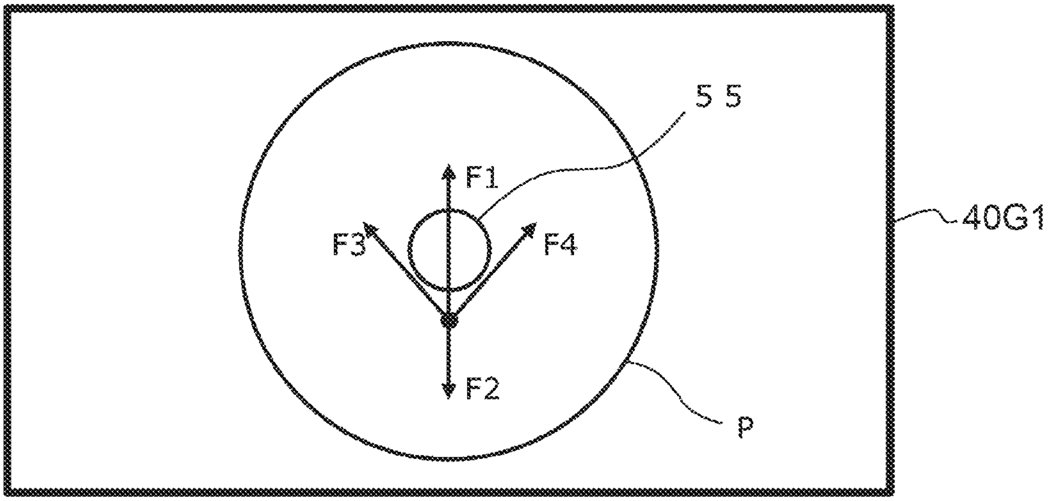
FIG. 12B is a diagram showing a teaching trajectory guidance display.

FIG. 12A and FIG. 12B are diagrams showing guidance on trajectories to be taught. In FIG. 12A and FIG. 12B, a component P with a certain thickness is displayed, with a circular shape containing the hole 55, at a screen 40G1 of the monitor 40G. The image of the component P is created on the basis of a captured image of the component P or CAD data of the component P. Alternatively, according to specification of the kind of task—the task of inserting a peg in a hole—a shape representing the hole may be displayed without display of an outline of the component P. In this case, there is no need to acquire information on the shape of the component P. In FIG. 12A, a single arrow that is a successful trajectory guidance display and a character S alongside the arrow are displayed. The successful trajectory indicated by this successful trajectory guidance display is referred to as successful trajectory S. In FIG. 12B, four arrows that are failed trajectory guidance displays and characters F1, F2, F3 and F4 alongside the arrows are displayed. The failed trajectories indicated by this failed trajectory guidance display are referred to as failed trajectories F1, F2, F3 and F4. Arrows indicating trajectories may be curved lines. A trajectory prior to the peg 54 making contact with the component P may be displayed such that the teacher may understand the trajectory that is being taught in three dimensions.

The successful trajectory guidance display in FIG. 12A is guidance to put the peg 54 gripped by the robot teaching device 20 into contact with the component P in the vicinity of the start point of the arrow, move the peg 54 toward the end point of the arrow while maintaining the contact, and insert the peg 54 into the hole 55. If it is considered easy for a teacher to perform the task successfully without a display such as that in FIG. 12A, a guidance display that is simply a text request may be appropriate, such as "insert the peg in the hole" or "put the peg into contact with the component at the nearer side of the hole and insert the peg into the hole."

The failed trajectory guidance displays in FIG. 12B are guidance to put the peg 54 gripped by the robot teaching device 20 into contact with the component P in the vicinity of the start point of each arrow and move the peg 54 toward the end point of the arrow while maintaining the contact, and insert the peg 54 into the hole 55. For example, the failed trajectory F1 is guidance to put the peg 54 into contact with the component P at the start point of the arrow, which is at the nearer side of the hole 55, and then move the distal end of the peg 54 over the hole 55 to the opposite side of the hole 55. Similarly, the failed trajectory F2 is guidance to move the peg 54 the opposite way from the hole 55, the failed trajectory F3 is guidance to deviate to the left side of the hole 55, and the failed trajectory F4 is guidance to deviate to the right side of the hole 55.

Thus, when manipulation of the robot teaching device 20 is conducted in accordance with a guidance display for a successful trajectory or a failed trajectory, whether a trajectory that the trajectory generation device 40 acquires from the robot teaching device 20 is a successful trajectory or a failed trajectory is distinguished in advance. Therefore, there is no need to use the success button or failure button of the robot teaching device 20.

The clustering unit 44 in FIG. 11 generates clusters of successful classes of states of the robot 10 from states of the robot 10 belonging to the successful trajectory information and from states of the robot 10 belonging to the failed trajectory information.

The clustering unit 44 may employ a clustering method that uses, for example, a Gaussian mixture model (GMM). The clustering unit 44 may calculate degrees of similarity among the states of the robot 10 belonging to the successful trajectory information and the failed trajectory information, and may generate the clusters of successful classes on the basis of the calculated degrees of similarity.

From positions or positions and attitudes included at the states of the robot 10 belonging to the successful trajectory information and the failed trajectory information, the clustering unit 44 may calculate speeds of the robot 10 at the respective states and may calculate the degrees of similarity from the positions or positions and attitudes at the states and the speeds at the states.

The clustering unit 44 may adjust the degrees of similarity among the states of the robot 10 in accordance with adjustment parameters that adjust the degrees of similarity.

The clustering unit 44 may specify the adjustment parameters so as to increase a degree of similarity between states of the robot 10 that both belong to the successful trajectory information and so as to reduce a degree of similarity between a state of the robot 10 that belongs to the successful trajectory information and a state of the robot 10 that belongs to the failed trajectory information.

On the basis of the clusters of successful classes, the generation unit 46 generates target trajectory information representing a sequence of states of the robot 10 that may be used as control targets when the task is executed by the robot 10.

The generation unit 46 may apply Gaussian mixture regression (GMR) to the cluster of successful classes to generate the target trajectory information.

—Trajectory Generation Processing—

Figure 13:
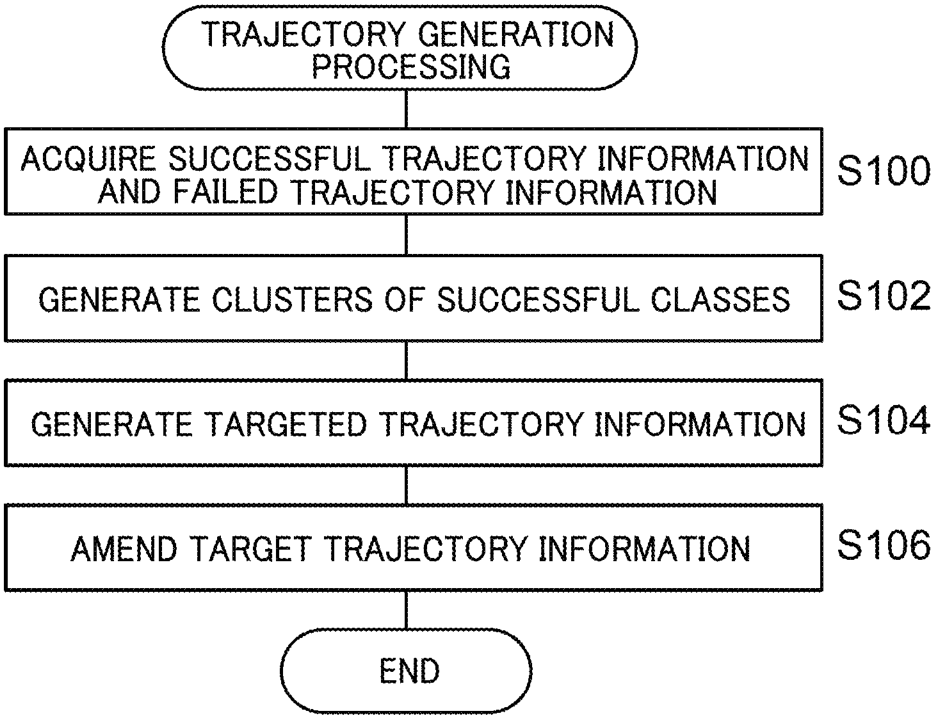
FIG. 13 is a flowchart of trajectory generation processing.

FIG. 13 is a flowchart of trajectory generation processing in which the trajectory generation device 40 generates the target trajectory information.

Prior to the processing shown in FIG. 13, a user uses the robot teaching device 20 to generate at least one set of successful trajectory information and generate at least one set of failed trajectory information. The robot teaching device 20 sends the generated successful trajectory information and failed trajectory information to the trajectory generation device 40.

In ordinary imitation learning, operations by a robot are learnt using only successful trajectory information representing a successful trajectory that is being taught. However, when a compliant robot is used, if kinematics or dynamics of the robot differ from a device used for teaching, the robot does not necessarily accurately follow the successful trajectory that has been taught. Moreover, following a trajectory that conforms excessively to only a successful trajectory may lead to failure of the task.

Accordingly, in the present exemplary embodiment, the target trajectory information that is used when learning operations of the task to be performed by the robot 10 is generated using the failed trajectory information as well as the successful trajectory information. As a result, target trajectory information of a target trajectory may be generated so as to avoid failed trajectories.

In step S100, the CPU 40A acts as the acquisition unit 42 and acquires successful trajectory information and failed trajectory information from the robot teaching device 20.

In step S102, the CPU 40A acts as the clustering unit 44 and generates clusters of successful classes of states of the robot 10, from states of the robot 10 belonging to the successful trajectory information and states of the robot 10 belonging to the failed trajectory information.

The present exemplary embodiment employs a clustering method using a Gaussian mixture model (GMM) to generate the clusters of successful classes. GMM represents a dataset by superposing plural Gaussian distributions. However, the representation capability of an ordinary GMM method is low and dividing successful trajectories from failed trajectories is difficult.

Generating clusters of successful classes from both successful trajectory information and failed trajectory information requires a number of Gaussian distributions (clusters) that is most applicable to the kinds of trajectory information, averages and variances of the Gaussian distributions, and weightings when the Gaussian distributions are superposed.

Therefore, in the present exemplary embodiment, in order to more distinctly classify failed trajectories and successful trajectories and automatically obtain a number of clusters and the like, a physically-consisted GMM (PC-GMM) recited in the following Reference Document 1 is employed.

—Reference Document 1—

FIGUEROA, Nadia; BILLARD, Aude. "A Physically-Consistent Bayesian Non-Parametric Mixture Model for Dynamical System Learning." In: CoRL. 2018. pp 927-946.

In step S102, the PC-GMM is applied to both the successful trajectory information and the failed trajectory information acquired in step S100, generating clusters of successful classes.

In the present exemplary embodiment, in order to generate an optimum number of Gaussian distributions, the PC-GMM is used to calculate degrees of similarity among the states of the robot 10 belonging to the successful trajectory information and the failed trajectory information and to generate clusters of successful classes on the basis of the calculated degrees of similarity.

In the present exemplary embodiment, the degrees of similarity are adjusted by adjustment parameters n that adjust degrees of similarity between states i and j of the robot 10. More specifically, a degree of similarity Δ is calculated by the expression below.

$$\Delta_{ij}(x_i, x_j, \dot{x}_i, \dot{x}_j) = \eta\left(1 + \frac{(\dot{x}_i)^{T}\dot{x}_j}{\|\dot{x}_i\|\|\dot{x}_j\|}\right)\exp\left(-l\|x_i - x_j\|^2\right)$$

In this expression, x represents a position of the robot 10, ẋ represents a speed of the robot 10, and l represents a scaling parameter.

That is, in step S102, the clustering unit 44 calculates speeds of the robot 10 at the respective states from the positions and attitudes included in the respective states of the robot 10 belonging to the successful trajectory information and the failed trajectory information, and calculates the degrees of similarity Δ from the positions and attitudes at the states and the speeds at the states.

On the basis of the degrees of similarity Δ, the clustering unit 44 determines to which cluster to assign each state of the robot 10 included in the successful trajectory information and the failed trajectory information.

Using these degrees of similarity based on positions and speeds of the robot 10, states of the robot 10 may be more accurately represented than by a conventional method that uses ordinary GMM.

In the present exemplary embodiment, in order to more distinctly divide successful trajectories from failed trajectories, as illustrated in expression (1), the degrees of similarity Δ are adjusted using the adjustment parameters η that adjust the degrees of similarity between states i and j of the robot 10.

In the present exemplary embodiment, the adjustment parameters η are specified so as to increase degrees of similarity between states of the robot 10 that each belong to the successful trajectory information and so as to reduce degrees of similarity between states of the robot 10 that belong to the successful trajectory information and states of the robot 10 that belong to the failed trajectory information.

More specifically, for example, η is set to 1.0 when two states are both in successful trajectories and, for example, η is set to 0.01 when two states are in a successful trajectory and a failed trajectory. Thus, the states belonging to the successful trajectory information and the states belonging to the failed trajectory information may be more easily clustered into separate clusters. Therefore, clusters that represent successful classes and clusters that represent failed classes may be more distinctly separated.

Figure 14:
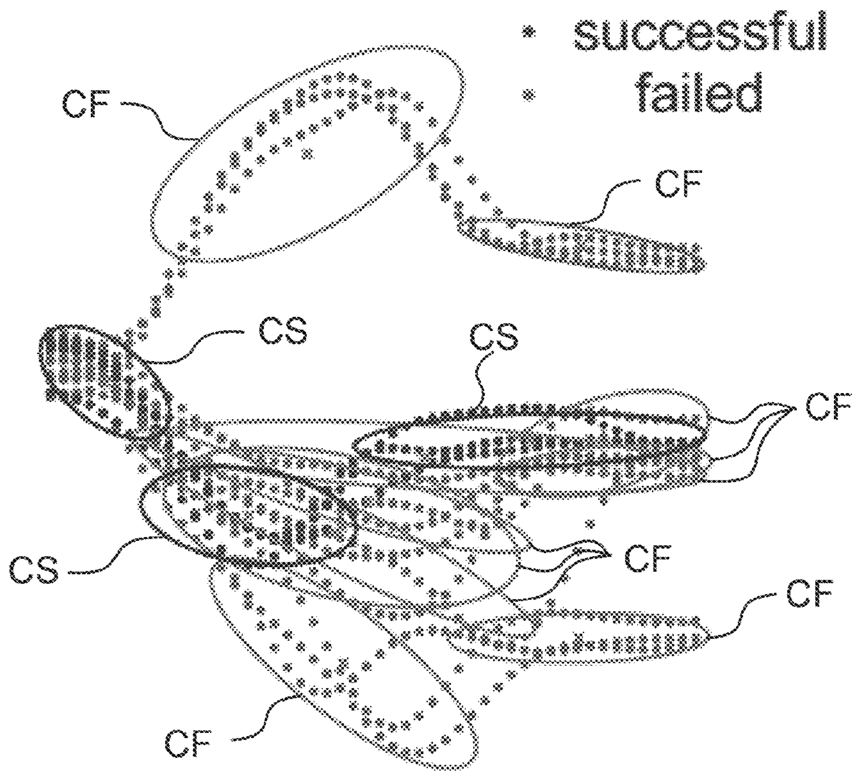
FIG. 14 is a diagram for describing clusters of successful classes and clusters of failed classes.
Figure 15:
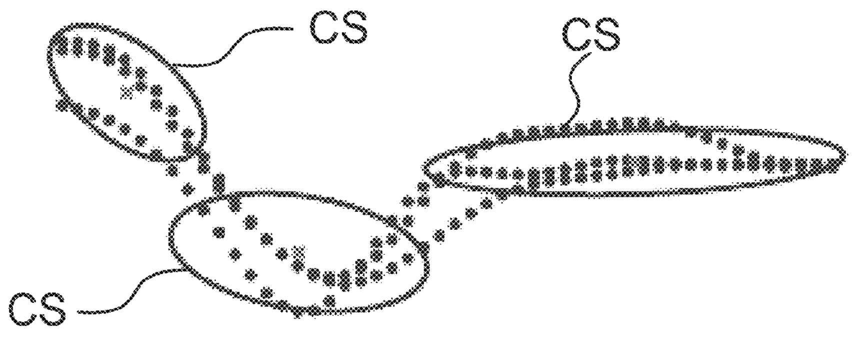
FIG. 15 is a diagram showing clusters of successful classes.
Figure 16:
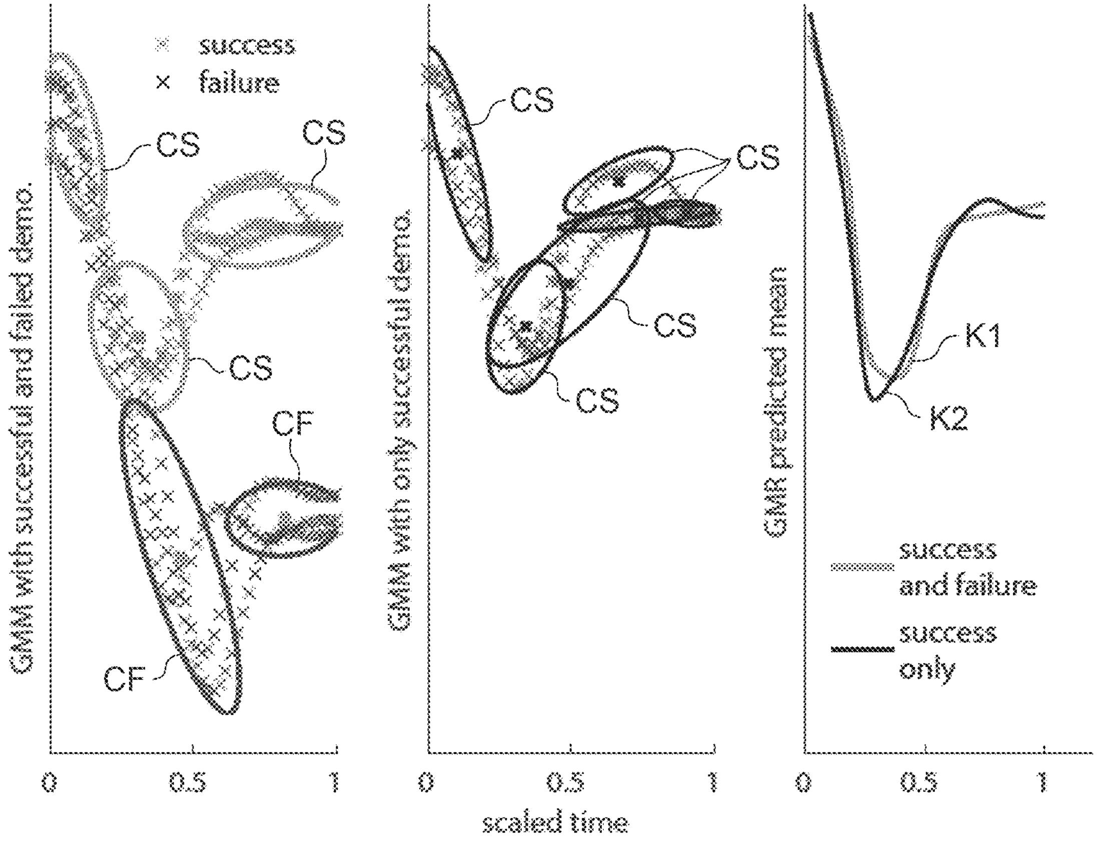
FIG. 16 is a diagram for describing a target trajectory that is generated using successful trajectory information and failed trajectory information, and a target trajectory that is generated using only the successful trajectory information.

The vertical axes of graphs in FIG. 14 to FIG. 16 represent positions of the robot teaching device 20 and the horizontal axes represent time. In these graphs, positions of the robot teaching device 20 depict a component of direction in the direction from the initial position of each trajectory in FIG. 12A and FIG. 12B toward the center of the hole 55. The direction upward in FIG. 12A and FIG. 12B corresponds to the direction downward in FIG. 14 to FIG. 16. FIG. 14 to FIG. 16 plot measured values of positions of the robot teaching device 20 in accordance with the passage of time. Points depicted as "successful" in FIG. 14 to FIG. 16 are measured values when a successful trajectory is taught (successful trajectory information), and points depicted as "failed" are measured values when a failed trajectory is taught (failed trajectory information). In FIG. 14 to FIG. 16, clusters CS of successful classes and clusters CF of failed classes are shown by respective ellipses. The clusters CS of the successful classes and the clusters CF of the failed classes are generated by applying PC-GMM to the successful trajectory information and failed trajectory information. Actual clusters are represented by distributions of values in accordance with Gaussian distributions; the ellipses shown in the drawings depict contours of values of the clusters. FIG. 15 shows the successful trajectory information and clusters CS of successful classes extracted from FIG. 14.

In FIG. 14, in an initial time range, the successful trajectories are oriented to the lower side of the graph (upward in FIG. 12A and FIG. 12B). This region represents a movement of the robot teaching device 20 corresponding to the Fit sub-task of FIG. 3. A lowermost point of the successful trajectories in FIG. 14 corresponds with a final state of the Fit sub-task, at which the distal end of the peg 54 is engaged with the hole 55, the attitude of the peg 54 is tilted slightly, and the robot teaching device 20 has passed slightly beyond directly above the hole 55. A subsequent region in which the successful trajectories change toward the upper side of the graph (downward in FIG. 12A and FIG. 12B) corresponds to the Align sub-task of FIG. 3. In this region, the movement direction of the robot teaching device 20 reverses and the attitude of the peg 54 is pulled to the vertical. At least portions of changes in position of the successful trajectories in the latter half of FIG. 14 correspond to the Insert sub-task of FIG. 3. In this region, the successful trajectories are oriented in the axial direction of the hole and the positional component represented by the vertical axis in FIG. 14 changes barely at all.

In FIG. 14, the failed trajectories and clusters CF of failed classes at the upper side relative to the successful trajectories are results from when the robot teaching device 20 is moved in the opposite direction from the direction toward the hole 55, as in the failed trajectory F2 in FIG. 12B. The failed trajectories and clusters CF of failed classes at the lower side relative to the successful trajectories are results from when the robot teaching device 20 is moved to deviate to the left or right from the direction toward the hole 55, as in the failed trajectories F3 and F4 in FIG. 12B.

The diagram at the left side of FIG. 16 shows the clusters CS of successful classes that are generated from both the successful trajectory information and the failed trajectory information and the clusters CF of failed classes that are generated from both the successful trajectory information and the failed trajectory information. The diagram at the middle of FIG. 16 shows clusters CS of successful classes that are generated only from the successful trajectory information. The diagram at the right side of FIG. 16 shows a target trajectory K1 ("success and failure") that is generated by applying GMR to the clusters CS of successful classes shown in the diagram at the left side of FIG. 16, and a target trajectory K2 ("success only") that is generated by applying GMR to the clusters CS of successful classes shown in the diagram at the middle of FIG. 16. As can be seen in FIG. 16, the target trajectory K1 is a trajectory with fewer sudden changes than the target trajectory K2. This indicates that a lower maximum speed is sufficient for the target trajectory K1. Thus, it can be assessed that the target trajectory K1 does not conform excessively to only the successful trajectory information.

In step S104 of FIG. 13, the CPU 40A acts as the generation unit 46 and, on the basis of the clusters CS of successful classes, generates target trajectory information that represents a sequence of states of the robot 10, which may be used as control coordinates when the robot 10 is caused to execute the task. More specifically, GMR is applied to the clusters CS of successful classes to generate the target trajectory information. GMR provides changes with time of position as represented by Gaussian distributions. Changes with time of maximum values or average values of the position distributions may be used as control targets. Although position information in only one dimension is described here, target trajectory information may in practice be generated in multiple dimensions on the basis of successful trajectory information and failed trajectory information in multiple dimensions.

In step S106, the CPU 40A amends the target trajectory information generated in step S104. The target trajectory information generated in step S104 represents a trajectory (for example, positions and attitudes) of the robot teaching device 20. Therefore, the target trajectory information needs to be amended (converted) to a trajectory of the robot 10. Accordingly, step S106 amends the target trajectory information generated in step S104 by, for example, an offset that is a difference between a position and attitude of the robot 10 and a position and attitude of the robot teaching device 20 in the state in which the peg 54 has been inserted into the hole 55.

In the present exemplary embodiment, it is assumed that there is no inconsistency in positions of the peg 54 relative to the gripper 12 during execution of the task. In practice, however, there may be differences between positions of the peg 54 relative to the gripper 12 each time the peg 54 is gripped. Accordingly, a position of the peg 54 relative to the gripper 12 may be calculated on the basis of an image captured by an external camera, and the target trajectory information may be amended on the basis of the calculated position.

—Learning Device—

The learning device 50 uses machine learning to acquire a learning model of the robot 10. The present exemplary embodiment employs reinforcement learning in which learning is conducted by trial and error without training data, which is model-based machine learning with a particularly high data efficiency.

A learning model acquired by the learning device 50 (a learned model) is installed on a control device that controls the robot 10 and the learned model supports actual operations. This control device may include learning functions, in which case the control device may perform additional learning.

In the present exemplary embodiment, because the robot 10 includes the compliant portion 13, the robot 10 can easily carry out operations without complex force control while the gripper 12 or the object is in contact with the surroundings. Furthermore, because the gripper or the object may be put into contact with the surroundings with very little deceleration, high-speed operations are possible. Because the learning model is acquired by machine learning, system building is simple.

Figure 17:
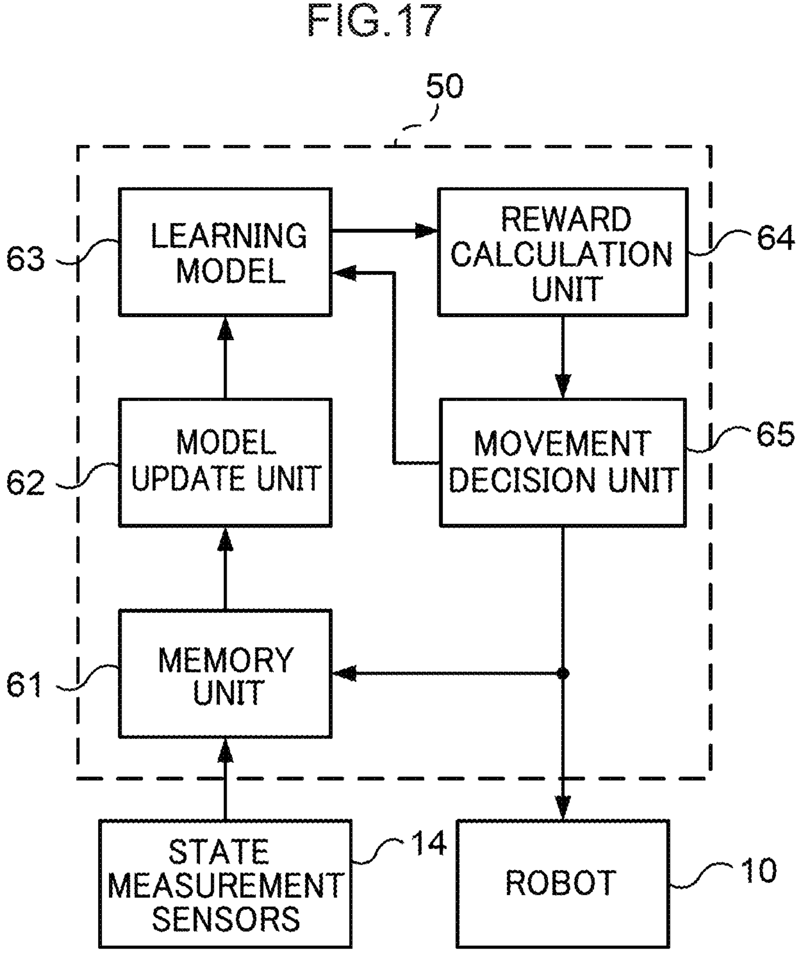
FIG. 17 is a functional block diagram of a learning device.

As shown in FIG. 17, the learning device 50 is provided with a memory unit 61, a model update unit 62, a learning model 63, a reward calculation unit 64 and a movement decision unit 65.

The memory unit 61 memorizes state measurement data relating to states of the robot 10 that have been measured by the state measurement sensors 14 and speed command values outputted from the movement decision unit 65.

From the state measurement data and speed command values memorized at the memory unit 61, the model update unit 62 acquires a plural number (for example, 300) of sets of measurement data for plural times t selected at random, with one set of measurement data being state measurement data of a state $x_t$ at the time t, a speed command value $u_t$, and state measurement data of a state $x_{t+1}$ at a succeeding time t+1.

Then, from the acquired plural sets of measurement data, the model update unit 62 updates model parameters of the learning model 63 at intervals of a control cycle, with the goal of minimizing differences between a predicted value $f(x_t,u_t)$ of the state x at time t+1 which is calculated by the learning model 63 from the state $x_t$ measured at time t and the speed command value $u_t$ and the state $x_{t+1}$ that is measured at time t+1. Thus, the model update unit 62 uses a "gradient method" to update the model parameters, and outputs the updated model parameters to the learning model 63. The model parameters are updated one or a plural number of times in a single control cycle, prior to other processing at a start time of the control cycle. If sufficiently many sets of the measurement data described above can be gathered, the model parameters may be updated before the start of a task rather than at intervals of the control cycle. For example, when the same task is executed repeatedly, such as the task of inserting a peg into a hole, the model parameters may be updated between the end of one execution of the task and the start of the next execution of the task. As an alternative example, an update of the model parameters is completed during test operations until a specific task can be executed, and the model parameters need not be updated after the start of actual execution of the task.

As the learning model 63, for example, a state transition model can be used. A state transition model inputs a state $x_t$ and a speed command value $u_t$ that is a movement of the robot 10 at that time, and outputs the next state $x_{t+1}$ after the movement.

The learning model 63 inputs n candidates for speed command values from the movement decision unit 65, generates n expected values for a state, and outputs the n expected values to the reward calculation unit 64.

For each of the n expected values $f(x_t,u_t)$ of a state outputted from the learning model 63, the reward calculation unit 64 calculates a reward value $r_{t+1}$ with the expression below, and outputs the reward value to the movement decision unit 65.

$$r_{t+1}=-(xd_{t+1}-f(x_t,u_t))^2 \quad (2)$$

In this expression, xd represents a target value for the state of the robot 10, that is, a target value of a value in six dimensions representing the position and attitude of the robot 10. The target value is obtained from the target trajectory information generated by the trajectory generation device 40. The symbol f represents a function expressing the learning model, and $f(x_t,u_t)$ represents a predicted value of the value in six dimensions representing the position and state of the robot 10.

The learning model 63 outputs a predicted value for the succeeding time t+1, which is to say a succeeding time step (control cycle), but may output predicted values for a plural number of steps ahead. The reward calculation unit 64 calculates reward values r from a predicted value and a target value corresponding to the predicted value for each time step, and outputs a reward value R that is a sum of the reward values r.

On the basis of relationships between the n candidates for speed command values and the respectively corresponding reward values r or reward values R, the movement decision unit 65 finds a speed command value that may maximize the reward value and outputs that speed command value to the robot 10. As an example in the present exemplary embodiment, a "cross entropy method" (CEM) is used to specify speed command values that may maximize reward values, which are outputted to the robot 10.

In an initial state of learning, in which sufficient data has not been accumulated at the memory unit 61, the learning model 63 need not be employed and reward values need not be used for movement decisions at the movement decision unit 65. In this situation, a random speed command value may be outputted from the movement decision unit 65 to the robot 10, resulting state measurement data that is measured may be collected, and this may be repeated at intervals of a control cycle. Updating of the model parameters may start from a time at which a certain amount of state measurement data has been collected.

—Learning Processing—

Figure 18:
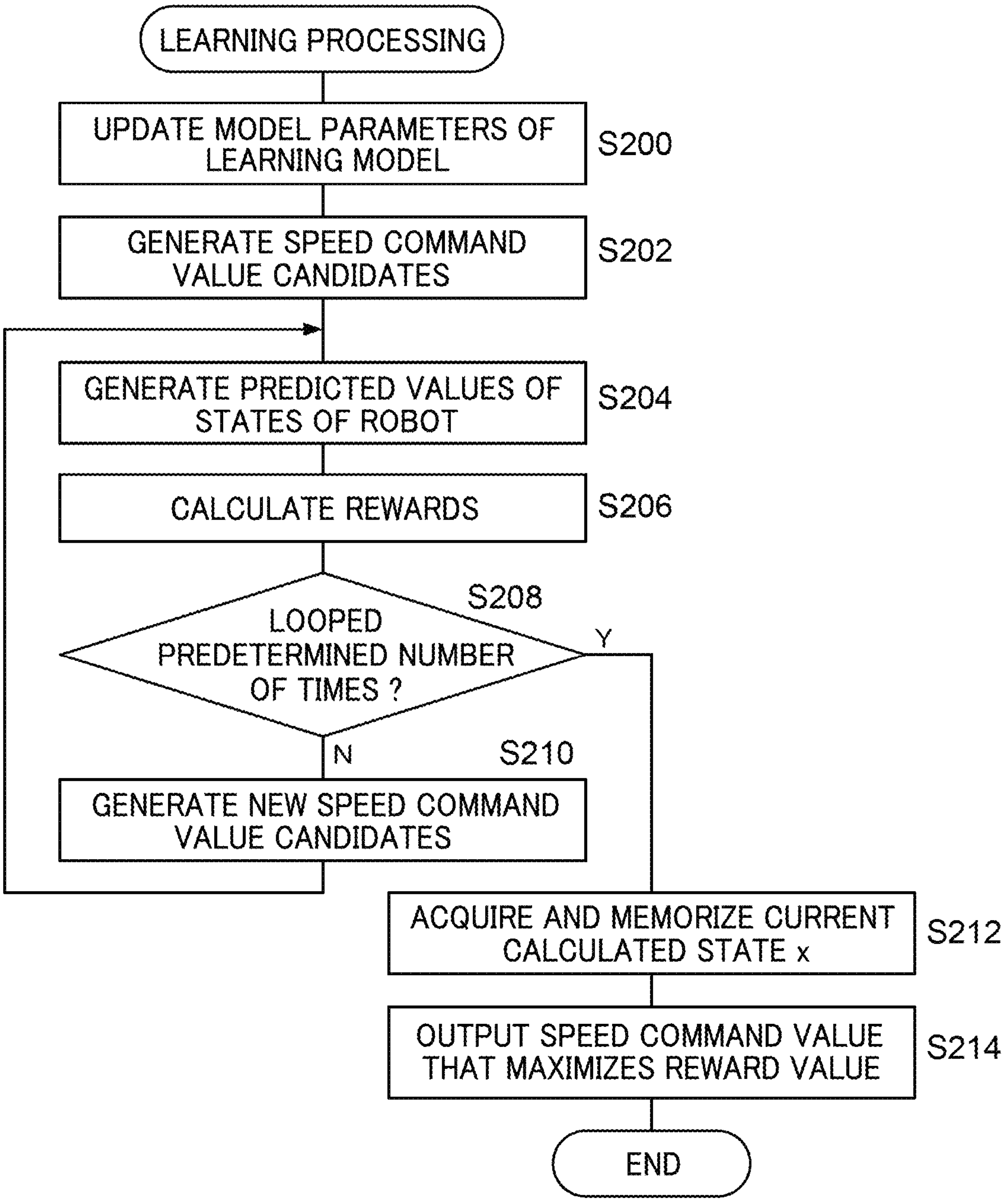
FIG. 18 is a flowchart of learning processing.

FIG. 18 is a flowchart showing a flow of learning processing in which the learning device 50 uses machine learning for learning by the learning model 63.

The processing of step S200 to step S214 described below is executed at intervals of a certain duration according to the control cycle.

In step S200, the model update unit 62 updates the learning model. More specifically, for each of, for example, 100 times t selected at random from the data memorized at the memory unit 61, the model update unit 62 acquires a set of a state (position and attitude) $x_t$, a speed command value $u_t$ and a state $x_{t+1}$. The states $x_{t+1}$, which are memorized for times t+1 succeeding the selected times t, are measured states.

Next, new model parameters that amend the previous model parameters are determined. The amendment of the model parameters is conducted with the goal of minimizing differences between the states $x_{t+1}$ and predicted values $f(x_t,u_t)$.

The new model parameters are set in the learning model 63. The new model parameters are memorized in the model update unit 62 to be employed as the "previous model parameters" in the next control cycle.

In step S202, the movement decision unit 65 randomly generates n (for example, 300) speed command value candidates and outputs the speed command value candidates to the learning model 63.

In step S204, the learning model 63 generates n predicted values of a state corresponding to the n speed command value candidates generated in step S202, and outputs the predicted values to the reward calculation unit 64.

In step S206, the reward calculation unit 64 calculates a reward value for each of the n predicted values of the state generated in step S204.

In step S208, a determination is made as to whether the present routine has looped a predetermined number of times (for example, twice). When the present routine has not looped the predetermined number of times, the learning device 50 proceeds to step S210, and when the present routine has looped the predetermined number of times, the learning device 50 proceeds to step S212.

In step S210, the movement decision unit 65 extracts m speed command value candidates for which the reward values are highest from the n speed command value candidates and reward values. The value of m is set to around 30% of the value of n (for example, to 100). The movement decision unit 65 calculates an average and variance of the m extracted speed command value candidates and generates a normal distribution. Then, the movement decision unit 65 generates n new speed command value candidates with a probability density matching the generated normal distribution. Subsequently, the learning device 50 returns to step S204 and utilizes the n speed command value candidates generated in step S210.

In step S212, the learning device 50 acquires a current measured state x resulting from the preceding speed command, and memorizes this state x at the memory unit 61.

In step S214, the movement decision unit 65 outputs a speed command value u that may maximize the reward value to the robot 10, and memorizes the speed command value u at the memory unit 61.

According to the present exemplary embodiment, target trajectory information that is used when learning a movement of a task that the robot 10 performs is generated by using failed trajectory information as well as successful trajectory information. Therefore, target trajectory information of a target trajectory that does not excessively conform only to successful trajectory information is generated, so as to avoid failed trajectories. Hence, the target trajectory information generated in this manner is used to control the robot 10, as a result of which the task may be achieved with a comparatively high success rate.

The exemplary embodiment described above is no more than an exemplary description of an example of the present disclosure. The present disclosure is not to be limited by the specific modes described above: numerous modifications are possible within the scope of the technical gist of the disclosure.

The trajectory generation processing that, in the exemplary embodiment described above, is executed by a CPU reading software (a program) may be executed by various kinds of processor other than a CPU. Examples of processors in these cases include a PLD (programmable logic device) in which a circuit configuration can be modified after manufacturing, such as an FPGA (field-programmable gate array) or the like, a dedicated electronic circuit which is a processor with a circuit configuration that is specially designed to execute specific processing, such as an ASIC (application-specific integrated circuit) or the like, and so forth. The trajectory generation processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiment described above, a mode is described in which the trajectory generation program is memorized in advance (installed) at the storage 40D or ROM 40B, but this is not limiting. The program may be provided in a mode that is recorded at a recording medium such as a CD-ROM (compact disc read-only memory), DVD-ROM (digital versatile disc read-only memory), USB (universal serial bus) memory or the like. Modes are also possible in which the programs are downloaded from external equipment via a network.

The disclosures of Japanese Patent Application No. 2020-175009 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

EXPLANATION OF THE REFERENCE SYMBOLS

1 Robot system
10 Robot
11 Arm
12 Gripper
13 Compliant portion
14 State measurement sensors
20 Robot teaching device
40 Trajectory generation device
42 Acquisition unit
44 Clustering unit
46 Generation unit
50 Learning device

The invention claimed is:

1. A trajectory generation device, comprising:
a processor configured to:
acquire trajectory information representing sequences of states of a controlled object being taught by a teacher, the trajectory information including successful trajectory information and failed trajectory information, the successful trajectory information being trajectory information when a task performed by the controlled object is successful, and the failed trajectory information being trajectory information when the task is failed;
from the states of the controlled object belonging to the successful trajectory information and the states of the controlled object belonging to the failed trajectory information, generate a cluster of a successful class of the states of the controlled object;
on the basis of the cluster of the successful class, generate target trajectory information representing a sequence of states of the controlled object, the sequence of states being used as control targets when the controlled object is caused to execute the task; and
render a display for providing guidance on a trajectory that is to be taught,
wherein the states of the controlled object are positions of the controlled object or positions and attitudes of the controlled object, the processor is configured to calculate a speed of the controlled object in each state, from the positions or the positions and attitudes included in the states of the controlled object belonging to the successful trajectory information and the failed trajectory information and the processor is configured to calculate degrees of similarity among the states of the controlled object belonging to the successful trajectory information and the failed trajectory information based on the positions or the positions and attitudes in the states and speeds in the states,
wherein the processor is configured specify an adjustment parameter to adjust the degrees of similarity so as to:
increase a degree of similarity between states of the controlled object that respectively belong to the successful trajectory information, and
reduce a degree of similarity between a state of the controlled object that belongs to the successful trajectory information and a state of the controlled object that belongs to the failed trajectory information.

2. The trajectory generation device according to claim 1, wherein the processor is configured to:
apply a clustering method that uses a Gaussian mixture model,
and
generate the cluster of the successful class on the basis of the calculated degrees of similarity.

3. The trajectory generation device according to claim 2, wherein the processor is configured to adjust the degrees of similarity among the states of the controlled object with the adjustment parameter.

4. The trajectory generation device according to claim 2, wherein the processor is configured to apply a Gaussian mixture regression method to the cluster of the successful class for generating the target trajectory information.

5. A trajectory generation method, comprising a computer executing processing including:
acquiring trajectory information representing sequences of states of a controlled object being taught by a teacher, the trajectory information including successful trajectory information and failed trajectory information, the successful trajectory information being trajectory information when a task performed by the controlled object is successful, and the failed trajectory information being trajectory information when the task is failed;
from the states of the controlled object belonging to the successful trajectory information and the states of the controlled object belonging to the failed trajectory information, generating a cluster of a successful class of the states of the controlled object;
on the basis of the cluster of the successful class, generating target trajectory information representing a sequence of states of the controlled object, the sequence of states being used as control targets when the controlled object is caused to execute the task; and
rendering a display for providing guidance on a trajectory that is to be taught,
wherein the states of the controlled object are positions of the controlled object or positions and attitudes of the controlled object,
wherein generating a cluster of a successful class of the states of the controlled object comprises: calculating a speed of the controlled object in each state from the positions or the positions and attitudes included in the states of the controlled object belonging to the successful trajectory information and the failed trajectory information; and calculating degrees of similarity among the states of the controlled object belonging to the successful trajectory information and the failed trajectory information based on the positions or the positions and attitudes in the states and speeds in the states, wherein generating a cluster of a successful class of the states of the controlled object comprises:

specifying an adjustment parameter to adjust the degrees of similarity so as to:

increase a degree of similarity between states of the controlled object that respectively belong to the successful trajectory information, and reduce a degree of similarity between a state of the controlled object that belongs to the successful trajectory information and a state of the controlled object that belongs to the failed trajectory information.

6. The trajectory generation method according to claim 5, wherein generating a cluster of a successful class of the states of the controlled object comprises:

applying a clustering method that uses a Gaussian mixture model; and generating the cluster of the successful class on the basis of the calculated degrees of similarity.

7. The trajectory generation method according to claim 5, wherein generating target trajectory information comprises:

applying a Gaussian mixture regression method to the cluster of the successful class for generating the target trajectory information.

8. The trajectory generation method according to claim 5, wherein generating a cluster of a successful class of the states of the controlled object comprises:

adjusting the degrees of similarity among the states of the controlled object with the adjustment parameter.

9. A non-transitory recording medium storing a trajectory generation program that is executable by a computer to perform processing, the processing comprising:

acquiring successful trajectory information relating to a successful trajectory when an operation by a controlled object is successful and failed trajectory information relating to a failed trajectory when an operation by the controlled object fails;

on the basis of the successful trajectory information and the failed trajectory information, clustering positions of the controlled object on the successful trajectory and positions of the controlled object on the failed trajectory into a successful class and a failed class by a clustering method specified in advance;

on the basis of the positions of the controlled object clustered in the successful class, generating target trajectory information relating to a target trajectory of the controlled object; and rendering a display for providing guidance on a trajectory that is to be taught, wherein clustering positions of the controlled object on the successful trajectory and positions of the controlled object on the failed trajectory into a successful class and a failed class by a clustering method specified in advance comprises:

calculating a speed of the controlled object from the positions of the controlled object on the successful trajectory and positions of the controlled object on the failed trajectory; and calculating degrees of similarity among positions of the controlled object on the successful trajectory and positions of the controlled object on the failed trajectory based on the positions and speeds in the positions, wherein clustering positions of the controlled object on the successful trajectory and positions of the controlled object on the failed trajectory into a successful class and a failed class by a clustering method specified in advance comprises:

specifying an adjustment parameter to adjust the degrees of similarity so as to:

increase a degree of similarity between positions of the controlled object that respectively belong to the successful trajectory information, and reduce a degree of similarity between a position of the controlled object that belongs to the successful trajectory information and a position of the controlled object that belongs to the failed trajectory information.

10. The non-transitory recording medium according to claim 9, wherein clustering positions of the controlled object on the successful trajectory and positions of the controlled object on the failed trajectory into a successful class and a failed class by a clustering method specified in advance comprises:

applying the clustering method that uses a Gaussian mixture model; and generating the cluster of the successful class on the basis of the calculated degrees of similarity.

11. The non-transitory recording medium according to claim 9, wherein clustering positions of the controlled object on the successful trajectory and positions of the controlled object on the failed trajectory into a successful class and a failed class by a clustering method specified in advance comprises:

adjusting the degrees of similarity among the positions of the controlled object with the adjustment parameter that adjusts the degrees of similarity.

12. The non-transitory recording medium according to claim 9, wherein generating target trajectory information comprises:

applying a Gaussian mixture regression method to the cluster of the successful class for generating the target trajectory information.

* * * * *